United States Patent
Harrison

(10) Patent No.: US 10,642,404 B2
(45) Date of Patent: May 5, 2020

(54) TOUCH SENSITIVE DEVICE WITH MULTI-SENSOR STREAM SYNCHRONIZED DATA

(71) Applicant: QEEXO, CO., San Jose, CA (US)

(72) Inventor: Christopher Harrison, Pittsburgh, PA (US)

(73) Assignee: QEEXO, CO., Mountain View, CA (US)

(*) Notice: Subject to any disclaimer, the term of this patent is extended or adjusted under 35 U.S.C. 154(b) by 0 days.

(21) Appl. No.: 14/834,434

(22) Filed: Aug. 24, 2015

(65) Prior Publication Data

US 2017/0060279 A1    Mar. 2, 2017

(51) Int. Cl.
*G06F 3/043* (2006.01)
*G06F 3/041* (2006.01)
*G06F 3/044* (2006.01)

(52) U.S. Cl.
CPC ............ *G06F 3/0416* (2013.01); *G06F 3/043* (2013.01); *G06F 3/044* (2013.01); *G06F 2203/04101* (2013.01); *G06F 2203/04106* (2013.01)

(58) Field of Classification Search
CPC ....................................................... G06F 3/041
See application file for complete search history.

(56) References Cited

U.S. PATENT DOCUMENTS

| | | |
|---|---|---|
| 2,008,028 A | 7/1935 | Mccortney et al. |
| 2,430,005 A | 11/1947 | Denneen et al. |
| 3,354,531 A | 11/1967 | Pryor |
| 4,561,105 A | 12/1985 | Crane et al. |
| 4,597,932 A | 7/1986 | Kurihara et al. |
| 4,686,332 A | 8/1987 | Greanias et al. |
| 5,483,261 A | 1/1996 | Yasutake |
| 5,544,265 A | 8/1996 | Bozinovic et al. |
| 5,596,656 A | 1/1997 | Goldberg |
| 5,615,285 A | 3/1997 | Beernink |
| 5,625,818 A | 4/1997 | Zarmer et al. |
| 5,666,438 A | 9/1997 | Beernink et al. |

(Continued)

FOREIGN PATENT DOCUMENTS

| | | |
|---|---|---|
| CN | 1797305 A | 7/2006 |
| CN | 1928781 A | 3/2007 |

(Continued)

OTHER PUBLICATIONS

U.S. Appl. No. 14/495,041, filed Sep. 24, 2014, titled: "Method for Improving Accuracy of Touch Screen Event Analysis by Use of Spatiotemporal Touch Patterns." 34 pages.

(Continued)

*Primary Examiner* — Carl Adams
(74) *Attorney, Agent, or Firm* — Kwan & Olynick LLP

(57) ABSTRACT

Touch sensitive devices having sensor systems and sensor systems for use with touch sensitive devices are provided. A vibration sensor senses vibrations and a touch sensor senses contact with an object. Vibration data representing sensed vibration is stored in a sensor data memory and touch data indicative of contact between the object and the touch sensitive surface is stored in the sensor data memory in temporal association with the vibration data. The touch data and the temporal association with vibration data can be used to identify segments of the vibration data that are of interest.

19 Claims, 10 Drawing Sheets

(56) References Cited

U.S. PATENT DOCUMENTS

| | | |
|---|---|---|
| 5,867,163 A | 2/1999 | Kurtenbach |
| 5,933,514 A | 8/1999 | Ostrem et al. |
| 6,028,593 A | 2/2000 | Rosenberg et al. |
| 6,118,435 A | 9/2000 | Fujita et al. |
| 6,208,330 B1 | 3/2001 | Hasegawa et al. |
| 6,212,295 B1 | 4/2001 | Ostrem et al. |
| 6,222,465 B1 | 4/2001 | Kumar et al. |
| 6,246,395 B1 | 6/2001 | Goyins et al. |
| 6,252,563 B1 | 6/2001 | Tada et al. |
| 6,323,846 B1 | 11/2001 | Westerman et al. |
| 6,337,698 B1 | 1/2002 | Kelly, Jr. et al. |
| 6,492,979 B1 | 12/2002 | Kent et al. |
| 6,504,530 B1 | 1/2003 | Wilson et al. |
| 6,643,663 B1 | 11/2003 | Dabney et al. |
| 6,707,451 B1 | 3/2004 | Nagaoka |
| 6,748,425 B1 | 6/2004 | Duffy et al. |
| 6,772,396 B1 | 8/2004 | Cronin et al. |
| 6,933,930 B2 | 8/2005 | Devige et al. |
| 6,943,665 B2 | 9/2005 | Chornenky |
| 7,050,955 B1 | 5/2006 | Carmel et al. |
| 7,084,884 B1 | 8/2006 | Nelson et al. |
| 7,098,896 B2 | 8/2006 | Kushler et al. |
| 7,212,197 B1 | 5/2007 | Schkolne et al. |
| 7,443,396 B2 | 10/2008 | Ilic |
| 7,581,194 B2 | 8/2009 | Iwema et al. |
| 7,982,724 B2 | 7/2011 | Hill |
| 8,086,971 B2 | 12/2011 | Radivojevic et al. |
| 8,144,126 B2 | 3/2012 | Wright |
| 8,154,524 B2 | 4/2012 | Wilson et al. |
| 8,154,529 B2 | 4/2012 | Sleeman et al. |
| 8,170,346 B2 | 5/2012 | Ludwig |
| 8,199,126 B1 | 6/2012 | Taubman |
| 8,253,744 B2 | 8/2012 | Macura et al. |
| 8,269,744 B2 | 9/2012 | Agari et al. |
| 8,327,029 B1 | 12/2012 | Purser |
| 3,441,790 A1 | 5/2013 | Pance et al. |
| 8,547,357 B2 | 10/2013 | Aoyagi |
| 8,624,878 B2 | 1/2014 | Sarwar et al. |
| 8,670,632 B2 | 3/2014 | Wilson |
| 8,674,943 B2 | 3/2014 | Westerman et al. |
| 8,743,091 B2 | 6/2014 | Bernstein |
| 8,760,395 B2 | 6/2014 | Kim et al. |
| 8,762,332 B2 | 6/2014 | Keebler et al. |
| 8,769,524 B2 | 7/2014 | Bhullar et al. |
| 9,013,452 B2 | 4/2015 | Harrison et al. |
| 9,019,244 B2 | 4/2015 | Harrison |
| 9,030,498 B2 | 5/2015 | Galor et al. |
| 9,052,772 B2 | 6/2015 | West |
| 9,060,007 B2 | 6/2015 | Keebler et al. |
| 9,182,882 B2 | 11/2015 | Fowler et al. |
| 9,329,688 B2 | 5/2016 | Harrison |
| 9,329,715 B2 | 5/2016 | Schwarz et al. |
| 9,377,863 B2 | 6/2016 | Bychkov et al. |
| 9,557,852 B2 | 1/2017 | Tsai et al. |
| 9,612,689 B2 | 4/2017 | Harrison et al. |
| 9,696,859 B1 | 7/2017 | Heller et al. |
| 9,864,453 B2 | 1/2018 | Munemoto et al. |
| 10,082,935 B2 | 9/2018 | Harrison et al. |
| 2002/0009227 A1 | 1/2002 | Goldberg et al. |
| 2002/0057837 A1 | 5/2002 | Wilkinson et al. |
| 2002/0070927 A1 | 6/2002 | Fujitsuka et al. |
| 2002/0126161 A1 | 9/2002 | Kuzunuki et al. |
| 2003/0048260 A1 | 3/2003 | Matusis |
| 2003/0110085 A1 | 6/2003 | Murren et al. |
| 2003/0132922 A1 | 7/2003 | Phillip |
| 2003/0217873 A1 | 11/2003 | Paradiso et al. |
| 2004/0012573 A1 | 1/2004 | Morrison et al. |
| 2004/0021681 A1 | 2/2004 | Liao |
| 2004/0054711 A1 | 3/2004 | Multer |
| 2004/0141010 A1 | 7/2004 | Fitzmaurice et al. |
| 2004/0160421 A1 | 8/2004 | Sullivan |
| 2004/0199867 A1 | 10/2004 | Brandenborg |
| 2004/0225730 A1 | 11/2004 | Brown et al. |
| 2005/0083313 A1 | 4/2005 | Hardie-Bick |
| 2005/0131778 A1 | 6/2005 | Bennett et al. |
| 2005/0146512 A1 | 7/2005 | Hill et al. |
| 2005/0289461 A1 | 12/2005 | Amado et al. |
| 2006/0010400 A1 | 1/2006 | Dehlin et al. |
| 2006/0026535 A1 | 2/2006 | Hotelling et al. |
| 2006/0031746 A1 | 2/2006 | Toepfer et al. |
| 2006/0152499 A1 | 7/2006 | Roberts |
| 2006/0173985 A1 | 8/2006 | Moore |
| 2006/0184617 A1 | 8/2006 | Nicholas et al. |
| 2006/0217126 A1 | 9/2006 | Sohm et al. |
| 2006/0230021 A1 | 10/2006 | Diab et al. |
| 2006/0288329 A1 | 12/2006 | Gandhi et al. |
| 2007/0011205 A1 | 1/2007 | Majjasie et al. |
| 2007/0044010 A1 | 2/2007 | Sull et al. |
| 2007/0075965 A1 | 4/2007 | Huppi et al. |
| 2007/0085157 A1 | 4/2007 | Fadell et al. |
| 2007/0100959 A1 | 5/2007 | Eichstaedt et al. |
| 2007/0109279 A1 | 5/2007 | Sigona |
| 2007/0126716 A1 | 6/2007 | Haverly |
| 2007/0168367 A1 | 7/2007 | Dickinson et al. |
| 2007/0186157 A1 | 8/2007 | Walker et al. |
| 2007/0192674 A1 | 8/2007 | Bodin et al. |
| 2007/0245020 A1 | 10/2007 | Ott, IV |
| 2007/0257767 A1 | 11/2007 | Beeson |
| 2007/0291297 A1 | 12/2007 | Harmon et al. |
| 2008/0005666 A1 | 1/2008 | Sefton et al. |
| 2008/0036743 A1 | 2/2008 | Westerman et al. |
| 2008/0042978 A1 | 2/2008 | Perez-Noguera |
| 2008/0082941 A1 | 4/2008 | Goldberg et al. |
| 2008/0103906 A1 | 5/2008 | Singh |
| 2008/0117168 A1 | 5/2008 | Liu et al. |
| 2008/0126388 A1 | 5/2008 | Naaman |
| 2008/0141132 A1 | 6/2008 | Tsai |
| 2008/0155118 A1 | 6/2008 | Glaser et al. |
| 2008/0158147 A1 | 7/2008 | Westerman et al. |
| 2008/0158168 A1 | 7/2008 | Westerman et al. |
| 2008/0158185 A1 | 7/2008 | Westerman |
| 2008/0168403 A1 | 7/2008 | Westerman et al. |
| 2008/0180406 A1 | 7/2008 | Han et al. |
| 2008/0244468 A1 | 10/2008 | Nishihara et al. |
| 2008/0288347 A1 | 11/2008 | Sifry |
| 2008/0319932 A1 | 12/2008 | Yih et al. |
| 2009/0025987 A1 | 1/2009 | Perksi et al. |
| 2009/0073144 A1 | 3/2009 | Chen et al. |
| 2009/0095540 A1 | 4/2009 | Zachut et al. |
| 2009/0150373 A1 | 6/2009 | Davis et al. |
| 2009/0157206 A1 | 6/2009 | Weinberg et al. |
| 2009/0174679 A1 | 7/2009 | Westerman |
| 2009/0178011 A1 | 7/2009 | Ording et al. |
| 2009/0231275 A1 | 9/2009 | Odgers |
| 2009/0232355 A1 | 9/2009 | Minear et al. |
| 2009/0254869 A1 | 10/2009 | Ludwig et al. |
| 2009/0259628 A1 | 10/2009 | Farrell et al. |
| 2009/0262637 A1 | 10/2009 | Badaye et al. |
| 2009/0315835 A1 | 12/2009 | De Goes et al. |
| 2009/0318192 A1 | 12/2009 | Leblanc et al. |
| 2010/0036967 A1 | 2/2010 | Caine et al. |
| 2010/0060602 A1 | 3/2010 | Agari et al. |
| 2010/0085216 A1 | 4/2010 | Ms |
| 2010/0094633 A1 | 4/2010 | Kawamura et al. |
| 2010/0123666 A1 | 5/2010 | Wickholm et al. |
| 2010/0127997 A1 | 5/2010 | Park et al. |
| 2010/0194703 A1 | 8/2010 | Fedor et al. |
| 2010/0214267 A1 | 8/2010 | Radivojevic et al. |
| 2010/0225601 A1 | 9/2010 | Homma et al. |
| 2010/0251112 A1 | 9/2010 | Hinckley et al. |
| 2010/0265185 A1 | 10/2010 | Oksanen |
| 2010/0271322 A1 | 10/2010 | Kondoh et al. |
| 2010/0274622 A1 | 10/2010 | Kennedy et al. |
| 2010/0279738 A1 | 11/2010 | Kim et al. |
| 2010/0289754 A1 | 11/2010 | Sleeman et al. |
| 2010/0302184 A1 | 12/2010 | East et al. |
| 2010/0306649 A1 | 12/2010 | Russ et al. |
| 2010/0309158 A1 | 12/2010 | Iwayama et al. |
| 2010/0309933 A1 | 12/2010 | Stark et al. |
| 2011/0003550 A1 | 1/2011 | Klinghult et al. |
| 2011/0007000 A1 | 1/2011 | Lim |
| 2011/0018825 A1 | 1/2011 | Kondo et al. |
| 2011/0057670 A1 | 3/2011 | Jordan |
| 2011/0057885 A1 | 3/2011 | Lehtovirta |

(56) References Cited

U.S. PATENT DOCUMENTS

| | | |
|---|---|---|
| 2011/0074544 A1 | 3/2011 | D'Souza |
| 2011/0074701 A1 | 3/2011 | Dickinson et al. |
| 2011/0080349 A1 | 4/2011 | Holbein et al. |
| 2011/0133934 A1 | 6/2011 | Tan et al. |
| 2011/0134063 A1* | 6/2011 | Norieda .............. G06F 1/1624 345/173 |
| 2011/0134083 A1* | 6/2011 | Norieda .............. G06F 1/1624 345/177 |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1* | 7/2011 | Momeyer ............ G06F 1/1684 715/863 |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1 | 1/2012 | Li et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0262407 A1 | 10/2012 | Hinckley et al. |
| 2012/0274583 A1 | 11/2012 | Haggerty |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Sarnoff |
| 2013/0038554 A1 | 2/2013 | West |
| 2013/0091123 A1 | 4/2013 | Chen et al. |
| 2013/0100071 A1 | 4/2013 | Wright et al. |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1* | 1/2014 | Sheng ..................... H04R 3/00 345/173 |
| 2014/0032880 A1* | 1/2014 | Ka ..................... G06F 9/3885 712/30 |
| 2014/0037951 A1 | 2/2014 | Shigetomi et al. |
| 2014/0071095 A1 | 3/2014 | Godsill |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240295 A1 | 8/2014 | Harrison |
| 2014/0253477 A1 | 9/2014 | Shim et al. |
| 2014/0267065 A1 | 9/2014 | Levesque |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1* | 11/2014 | Kim ..................... G06F 21/32 726/16 |
| 2014/0368436 A1 | 12/2014 | Abzarian et al. |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0145820 A1 | 5/2015 | Huang et al. |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0012348 A1 | 1/2016 | Johnson et al. |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1 | 4/2016 | Veneri et al. |
| 2016/0156837 A1 | 6/2016 | Rodzevski et al. |
| 2016/0171192 A1 | 6/2016 | Holz et al. |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim et al. |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| EP | 0 938 039 A2 | 8/1999 |
| EP | 1 659 481 A2 | 5/2006 |
| EP | 1 762 926 A2 | 3/2007 |
| EP | 2 136 358 A1 | 12/2009 |
| EP | 2 280 337 A2 | 2/2011 |

(56) References Cited

FOREIGN PATENT DOCUMENTS

| | | | |
|---|---|---|---|
| GB | 2 344 894 A | 6/2000 | |
| GB | 2 468 742 A | 9/2010 | |
| JP | H09-69137 A | 3/1997 | |
| JP | 2004-213312 A | 7/2004 | |
| JP | 2005-018611 A | 1/2005 | |
| JP | 2007-524970 A | 8/2007 | |
| JP | 2009-543246 A | 12/2009 | |
| JP | 2011-028555 A | 2/2011 | |
| JP | 2013-519132 A | 5/2013 | |
| JP | 2013-532495 A | 8/2013 | |
| KR | 10-2002-0075283 A | 10/2002 | |
| KR | 10-2011-0061227 A | 6/2011 | |
| KR | 10-2012-0100351 A | 9/2012 | |
| WO | 94/004992 A1 | 3/1994 | |
| WO | 2006/070044 A1 | 7/2006 | |
| WO | 2008/126347 A1 | 10/2008 | |
| WO | 2009/071919 A1 | 6/2009 | |
| WO | 2011/096694 A2 | 8/2011 | |
| WO | 2012/064034 A1 | 5/2012 | |
| WO | 2012/166277 A1 | 12/2012 | |
| WO | 2013/059488 A1 | 4/2013 | |
| WO | 2013/061998 A1 | 5/2013 | |
| WO | 2014/037951 A1 | 3/2014 | |
| WO | 2014/182435 A1 | 11/2014 | |

OTHER PUBLICATIONS

U.S. Appl. No. 14/483,150, filed Sep. 11, 2014, titled: "Method and Apparatus for Differentiating Touch Screen Users Based on Touch Event Analysis." 38 pages.
U.S. Appl. No. 14/242,127, filed Apr. 1, 2014, titled: Method and Apparatus for Classifying DTouch Events on a Touch Sensitive Surface, 36 pages.
U.S. Appl. No. 13/849,698, filed Mar. 23, 2013, titled: "Method and System for Activating Different Interactive Functions Using Different Types of Finger Contacts." 52 pages.
U.S. Appl. No. 13/780494, filed Feb. 28, 2013, titled: "Input Tools Having Viobro-Acoustically Distinct Regions and Computing Device for Use With the Same." 34 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 7, 2018 in U.S. Appl. No. 14/219,919, 21 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.
Cheng, B. et aL, "SilentSense: Silent User Identification via Dynamics of Touch and Movement Behavioral Biometrics," Cryptography and Security (cs CR); Human-Computer Interaction, pp. 9, Aug. 31, 2013.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
Final Office Action dated Jan. 5, 2018 in U.S. Appl. No. 14/503,894, 16 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Communication pursuant to Article 94(3) EPC mailed on Feb. 26, 2018 for European Patent Application No. 14785422.8, 7 pages.
Communication pursuant to Article 94(3) EPC dated Mar. 5, 2018 for European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Weidong, S. et al., "SenGuard: Passive user identification on smartphones using multiple sensors," IEEE 7th International Conference on Wireless and Mobile Computing, Networking and Communications (WiMob), pp. 141-148, 2011.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Pedro, L et al., "Augmenting touch interaction through acoustic sensing", Proceedings of the ACM International Conference on Interactive Tabletops and Surfaces, pp. 53-56, Nov. 13-16, 2011.
Sarah, M. K. et al., "A Personal Touch—Recognizing Users Based on Touch Screen Behavior," PhoneSense'12, Nov. 6, 2012, Toronto, ON, Canada, Nov. 6, 2012, pp. 5.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Non-Final Office Action received for U.S. Appl. No. 14/242,127 dated Jun. 2, 2015, 33 pages.

(56) References Cited

OTHER PUBLICATIONS

Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Asano et al., "Real-Time Sound Source Localization and Separation System and Its Application to Automatic Speech Recognition", Proceedings of Eurospeech, 2001; p. 1013-1016; 2001.
Benko et al., "Sphere: Multi-Touch Interactions on a Spherical Display", Proceedings of UIST, 2008; pp. 77-86.
Burges, Christopher J.C., "A Tutorial on Support Vector Machines for Pattern Recognition", Data Mining and Knowledge Discovery, 2, 1998 pp. 121-167.
Cao et al., "ShapeTouch: Leveraging Contact Shape on Interactive Surfaces", IEEE International Workshop on Horizontal Interactive Human Computer System (TABLETOP), 2008, pp. 139-146.
Deyle et al., "Hambone: A Bio-Acoustic Gesture Interface", Proceedings of ISWC, 2007, pp. 1-8.
Dietz et al., DT Controls: Adding Identity to Physical Interfaces, ACM Symposium on User Interface Software & Technology (UIST), 2005, pp. 245-252.
Dietz et al., "DiamondTouch: A Multi-User Touch Technology" ACM Symposium on User Interface Software & Technology (UIST), 2001, pp. 219-226.
Gutwin et al., "Supporting Informal Collaboration in Shared-Workspace Groupware", Journal of Universal Computer Science, vol. 14, No. 9, 2008, pp. 1411-1434.
Hall et al., "The WEKA Data Mining Software: An Update", SIGKDD Explorations,vol. 11, No. 1, 2009, pp. 10-18.
Harrison et al., Skinput: Appropriating the Body as an Input Surface, Proceedings of CHI, Apr. 10-15, 2010, pp. 453-462.
Harrison et al., "Scratch Input: Creating Large, Inexpensive, Unpowered and Mobile Finger Input Surfaces", Proceedings of UIST, 2008, pp. 205-208.
Hartmann et al., "Augmenting Interactive Tables with Mice & Keyboards", Proceedings of UIST, 2009, pp. 149-152.
Hinckley et al., "Sensor Synaesthesia: Touch in Motion, and Motion in Touch", Proceedings of CHI, 2011, pp. 801-810.
Hinckley et al., "Pen+ Touch= New Tools", Proceedings of UIST, 2010, pp. 27-36.
Hinkley et al., "Manual Deskterity: An Exploration of Simultaneous Pen+ Touch Direct Input", Proceedings of CHI, 2010, pp. 2793-2802.
Holz et al., "The Generalized Perceived Input Point Model and How to Double Touch Accuracy by Extracting Fingerprints" Proceedings of CHI, 2010, pp. 581-590.
Kaltenbrunner., "reacTIVision: A Computer-Vision Framework for Table-Based Tangible Interaction", Proceedings ofTEI, 2007, pp. 69-74.
Matsushita et al., "HoloWall: Designing a Finger, Hand, Body, and Object Sensitive Wall", Proceedings of UIST, 1997, pp. 209-210.
"Mimio", http://www.mimio.com.
Olwal et al., "SurfaceFusion: Unobtrusive Tracking of Everyday Objects in Tangible User Interfaces", Proceedings of GI, 2008, pp. 235-242.
Paradiso et al., "Tracking and Characterizing Knocks Atop Large Interactive Displays", Sensor Review, vol. 25, No. 2, 2005, pp. 134-143.
Paradiso et al., "Sensor Systems for Interactive Surfaces", IBM Systems Journal, vol. 39 No. 3&4, 2000, pp. 892-914.
Patten, James, Mcmichael., "Sensetable: A Wireless Object Tracking Platform for Tangible User Interfaces", Proceedings of CHI, 2001, pp. 253-260.
Rekimoto et al., "Augmented Surfaces: A Spatially Continuous Work Space for Hybrid Computing Environments", Proceedings of CHI, 1999, pp. 378-385.
Rekimoto et al., "ToolStone: Effective use of the Physical Manipulation Vocabularies of Input Devices", Proceedings of UIST, 2000, pp. 109-117.
Rekimoto et al., "SmartSkin: An Infrastructure for Freehand Manipulation on Interactive Surfaces", Proceedings of CHI, 2002, pp. 113-120.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.
International Search Report and Written Opinion received for International Patent Application No. PCT/US2012/060865 dated Mar. 29, 2013, 10 pages.
Non-Final Office Action received for U.S. Appl. No. 15/206,554 dated Sep. 21, 2016, 36 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages.
Japanese Office Action for Japanese Patent Application No. 2014-537253 dated May 16, 2017, 5 pages.
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
European Search Report dated Jul. 24, 2015 for European Application No. 12842495.9, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Japanese Office Action for Japanese Patent Application No. 2017-049566 dated Jun. 5, 2018, 7 pages. (With English Translation).
Non-Final Office Action received for U.S. Appl. No. 14/684,407 dated Jul. 8, 2016, 11 pages.
Final Office Action received for U.S. Appl. No. 14/684,407 dated Jan. 18, 2017, 20 pages.
Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated on May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Final Office Action received for U.S. Appl. No. 14/219,919, dated Aug. 26, 2016, 24 pages.
Non-Final Office Action received for U.S. Appl. No. 14/191,329, dated Feb. 2, 2017, 20 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Non-Final Office Action received for U.S. Appl. No. 14/486,800, dated Dec. 1, 2016, 29 pages.

(56) References Cited

OTHER PUBLICATIONS

Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 14/684,407, dated Sep. 14, 2018, 24 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 13/958,427, dated Mar. 18, 2015, 50 pages.
Final Office Action received for U.S. Appl. No. 13/958,427, dated Jun. 19, 2015, 17 pages.
Non-Final Office Action received for U.S. Appl. No. 13/887,711, dated Apr. 6, 2015, 36 pages.
Final Office Action received for U S Appl. No. 14/191,329, dated Aug. 7, 2015, 29 pages.
Non-Final Office Action received for U.S. Appl. No. 14/492,604, dated Oct. 1, 2015, 16 pages.
International Search Report and Written Opinion received for PCT Application No. PCT/US2014/049485 dated Nov. 17, 2014, 9 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
Non-Final Office Action received for U.S. Appl. No. 14/483,150 dated Dec. 18, 2015, 7 pages.
Non-Final Office Action—dated Oct. 2, 2015 U.S. Appl. No. 14/486,800 filed Sep. 15, 2014, 21 pages.
Non-Final Office Action received for U.S. Appl. No. 14/503,894, dated Dec. 30, 2015, 18 pages.
Non-Final Office Action—dated Jan. 29, 2016 U.S. Appl. No. 14/219,919, 11 pages.
Non-Final Office Action received dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action—Dated Oct. 7, 2015 U.S. Appl. No. 14/495,041, 14 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture of Vibro-Accoustic Data Used to Determine Touch Types."
U.S. Appl. No. 14/191,329, filed Feb. 26, 2014, titled: "Using Capacitive Images for Touch Type Classification."
U.S. Appl. No. 13/887,711, filed May 6, 2013, titled: "Using Finger Touch Types to Interact with Electronic Devices."
U.S. Appl. No. 14/492,604, filed Sep. 22, 2014, titled: "Method and Apparatus for Improving Accuracy of Touch Screen Event Analysis by Use of Edge Classification." 35 pages.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Met al., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.
Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.

(56) References Cited

OTHER PUBLICATIONS

Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages (with English Translation).
Chinese Office Action for Chinese Patent Application No. 201280062500.7, dated Apr. 27, 2018, 19 pages (with English Translation).
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 12 pages (including English translation).
Office Action dated Jan. 28, 2019 for U.S. Appl. No. 15/836,798, 30 pages.
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages (with English Translation).
Chinese Office Action dated Feb. 9, 2018 for Chinese Patent Application No. 201480022056.5, 19 pages (with Translation).
Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Chinese First Office Action received for Chinese Patent Application No. 201510240372.6 dated Sep. 27, 2018, 18 pages.
Chinese Second Office Action received for Chinese Patent Application No. 201510240372.6 dated May 15, 2019, 16 pages.
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 10 pages.
Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 11 pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
European Search Report dated Apr. 8, 2019 for European Application No. 18195588.1, 7 pages.
Non-Final Office Action received for U.S. Appl. No. 15/836,798 dated Jul. 5, 2019, 95 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
Chinese First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.

* cited by examiner

US 10,642,404 B2

TOUCH SENSITIVE DEVICE WITH MULTI-SENSOR STREAM SYNCHRONIZED DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch sensing technology and more particularly to a method, apparatus and system for sensing touch contact with a surface.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Various electronic devices today are typically operated by a user interacting with a touch screen. This feature is particularly a characteristic of the recent generation of smart phones. Typically, touch screen display screens respond to finger contact to activate the display for further processes. Contact may also be made using tools such as a stylus, other parts of the hand such as the palm and various parts of the finger. Smartphone manufacturers continuously develop new techniques to improve smartphone user experience.

SUMMARY OF THE INVENTION

Touch sensitive devices and sensor systems for use with touch sensitive devices are provided. In one aspect, the touch sensitive device has a touch sensor system having a touch sensitive surface that senses contact between the touch sensitive surface and an object and that generates touch signals indicative of the sensed contact, a vibration sensor system that senses vibrations that occur incident to the contact between the touch sensitive surface and the object and that generates vibration signals indicative of the sensed vibrations and a sensor data memory. At least one controller is adapted to receive the vibration signals and to cause data indicative of vibrations sensed during each of a plurality of sample periods to be stored in a vibration data record in the sensor data memory. The controller is further adapted to receive the touch signals and to cause data to be stored in the sensor data memory in temporal association with the vibration data record from which a processor can identify a segment of the vibration data record related to the contact based upon the touch data record and the temporal association.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION OF THE INVENTION

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The figures in the following description relate to preferred embodiments by way of illustration only. The figures are not necessarily to scale. It should be noted that from the following discussion, alternative embodiments of the structures and methods disclosed herein will be readily recognized as viable alternatives that may be employed without departing from the principles of what is claimed.

Figure 1:
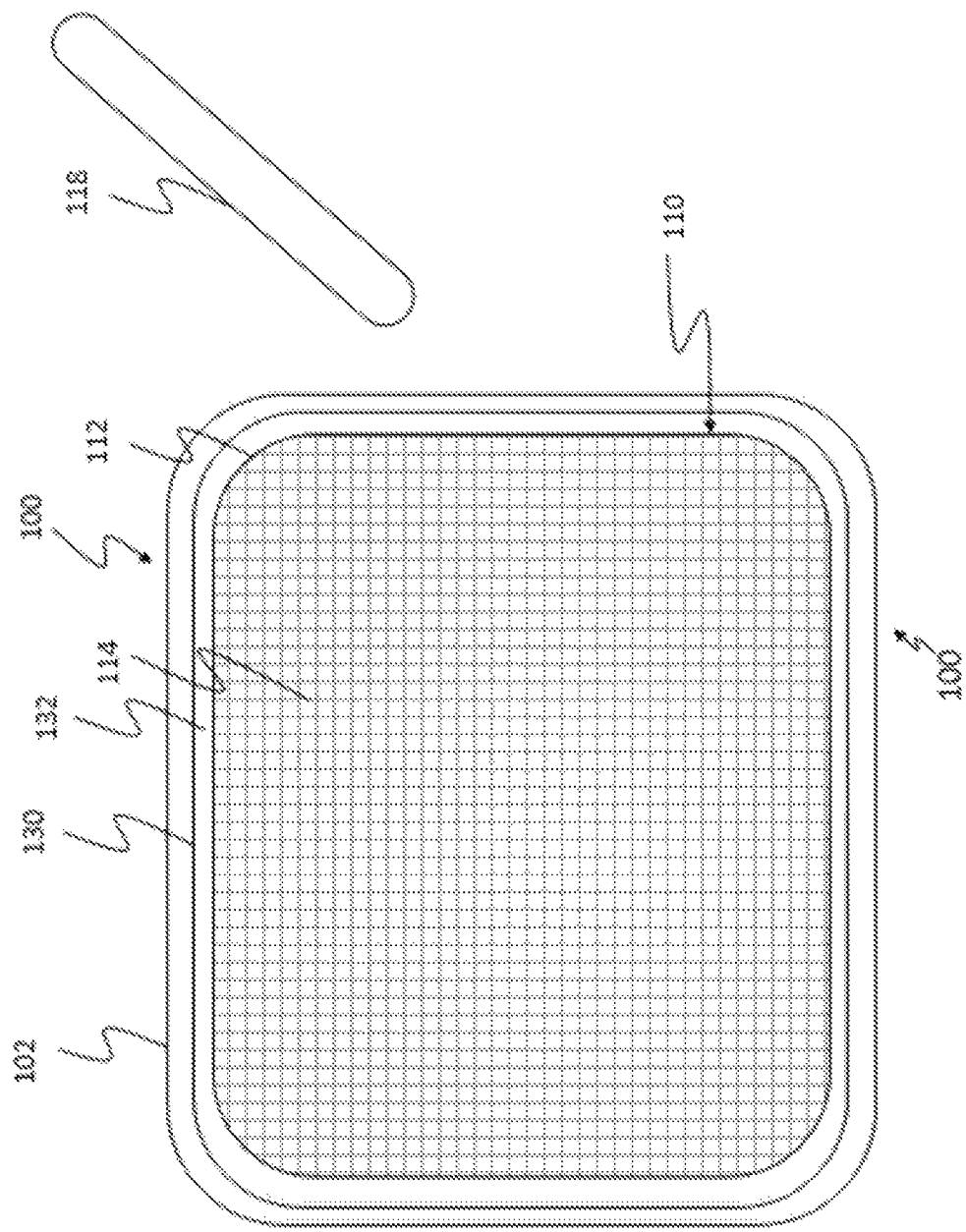
FIG. 1 illustrates an example touch sensing device having a touch sensitive surface, in accordance with some embodiments of the invention.
Figure 2:
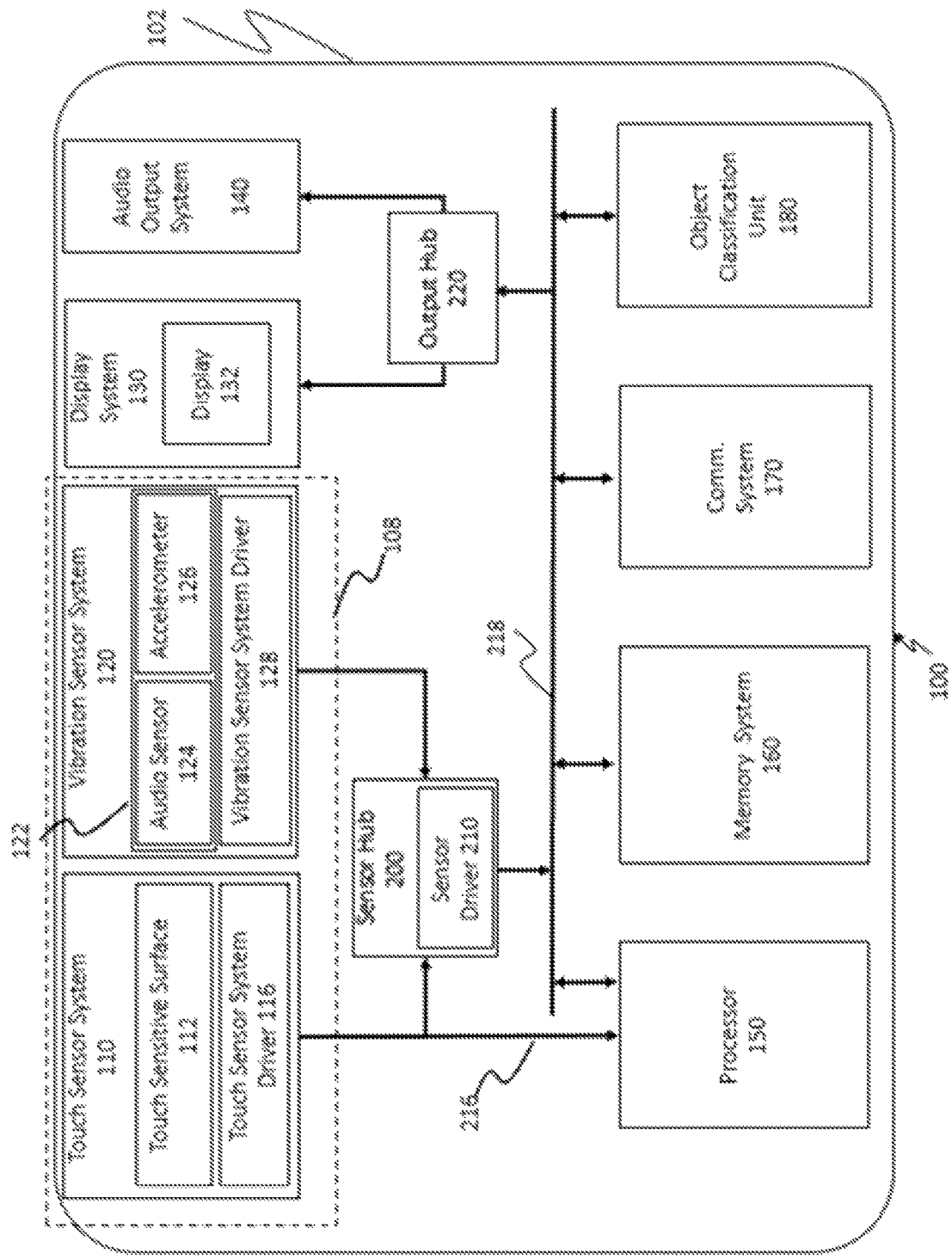
FIG. 2 illustrates an example touch sensitive device having a touch sensitive surface, in accordance with some embodiments of the invention.

FIG. 1 illustrates an exterior view of one embodiment of a touch sensitive device 100 and FIG. 2 shows a block diagram of touch sensitive device 100. In this embodiment, touch sensitive device 100 takes the form of a touch sensitive cellular telephone having housing 102 holding a sensor system 108 with a touch sensor system 110 and a vibration sensing system 120, a display system 130, an audio output system 140, a processor 150, a memory system 160, a communication system 170 and an optional object classification unit 180.

As is shown in FIG. 2, in this embodiment, a sensor hub 200 has a sensor driver 210 that receives signals from sensor system 108 and makes information from the signals available to processor 150, memory system 160, communication system 170 and optional object classification unit 180 while an output hub 220 receives signals from processor 150 and provides signals to display system 130 and audio output system 160 in accordance with the signals received from processor 150 and a main bus 218 connects sensor hub 200, output hub 220, processor 150, memory system 160, communication system 170 and object classification unit 180. Direct connections between individual components can be made. For example, a direct connection 216 between touch sensor system 110 and processor 150 is shown in this embodiment.

Touch sensor system 110 has a touch sensitive surface 112 that is adapted to detect when an object 118 such as a fingertip, body part, or stylus is positioned in contact with touch sensitive surface 112 and to generate a signal from which it can be determined which portion of touch sensitive surface 112 is in contact with object 118.

In this embodiment, touch sensitive surface 112 has a plurality of touch sensing elements 114. Each of elements in the array of sensing elements 114 are associated with a predetermined portion of touch sensitive surface 112 and are capable of sensing contact with object 118. Sensing elements 114 can be of any known type. Common sensing elements can include capacitive sensing elements that detect changes in capacitance as an object approaches or contacts sensing elements 114 and resistive sensing elements that detect changes in resistance caused by contact between object 118 and touch sensitive surface 112. Any other type of sensing can be used for this purpose.

For convenience object 118 will be referred to herein in the singular form however, it will be appreciated that touch sensitive surface 112 may be of a "multi-touch" type that is capable of detecting when multiple objects 118 are in contact with touch sensitive surface 112.

In the embodiment that is illustrated in FIGS. 1 and 2, touch sensor system 110 has a touch sensor system driver 116 that sweeps array of sensing elements 114 or otherwise samples each element in array of sensing elements 114 to determine which portions of touch sensitive surface 102 were in contact with object in a given period of time. The period of time can be any period, however, for example and without limitation the period of time can be $\frac{1}{30}^{th}$, $\frac{1}{60}^{th}$ or $\frac{1}{100}^{th}$ of a second. Touch sensor signals are then generated from which it can be determined which portions of touch sensitive surface 112 were in contact with object 118 during the period of time. These signals can take the form of frame data that can be stored, for example, in digital form for use by other systems inside or outside of touch sensitive device 100. Touch sensor system driver 116 in some embodiments may generate other signals indicative of contact against touch sensitive surface 112 such as signals that are indicative of contacts between touch sensitive surface 114 during a sample. Touch sensor system 116 may also generate signals that are indicative of proximity of object 118 to touch sensitive surface 114 such as may occur when capacitive sensing elements are used for touch sensitive surface 112 as such touch sensitive elements can detect proximity prior of certain objects to touch sensitive surface 112 to contact. Other forms of proximity sensing may be used.

In this embodiment, touch sensitive device 100 further has a memory system 160. Memory system 160 is capable of storing frame data and may be capable of storing programs, executable algorithms, computer readable instructions or computer program code and other forms of instructions that can be executed by a processor 150 and may also be used for other purposes. Memory system 160 may include read only memory, random access semiconductor memory or other types of memory or computer readable media that may be permanently installed or separably mounted to touch sensitive device 100. Additionally, touch sensitive device 100 may also access a memory system 160 that is separate from touch sensitive device 100 by way of an optional communication system 170.

Processor 150 shown in the embodiment of FIGS. 1 and 2 can take the form of any device capable of performing the functions described herein including but not limited to a computer, micro-processor, micro-controller, programmable analog logic device, or a combination of devices and can be a stand-alone device or combination of devices.

Sensor system 108 can take any of a variety of forms and can comprise generally any known device for sensing conditions inside or outside of touch sensitive device 100. Sensor system 108 can, without limitation, include acoustic sensors, accelerometers, gyroscopes, light sensors, range finders, proximity sensors, barometer, touch input sensors, thermometers, Hall effect sensors, switches such as 2-way, 4-way switch, a 6-way switch, an 8-way switch, mouse and trackball systems, a joystick system, a voice recognition system, a video based gesture recognition system or other such systems, radio frequency identification and near field communication sensors, bar code sensors, position sensors and other sensors known in the art that can be used to detect conditions that may be useful to in governing operation of touch sensitive device 100 and to convert this information into a form that can be used by processor 140. Sensor system 108 may also include biometric sensors adapted to detect characteristics of a user that can be used, for example for security, medical and affective determinations.

Alternatively or additionally, vibration sensor system 120 can include vibration sensors, ultrasonic sensors, piezoelectric devices or other known circuits and systems that can sense vibrations such pressure waves carried by air surrounding touch sensitive system 100 such as acoustic signals or sounds, and/or acoustic signals that can carry mechanical vibrations carried through structures of touch sensitive device 100 or object 118 including but not limited to those that are indicative of contact between an object 118 and touch sensitive surface 112

Examples of sensor types that can be used to sense vibrations and that may be used as vibration sensors in a vibration sensor system 120 useful in operating a touch sensitive device include but are not limited to:

Piezoelectric bender elements;

Piezoelectric film;

Accelerometers (e.g., linear variable differential transformer (LVDT), Potentiometric, Variable Reluctance, Piezoelectric, Piezoresistive, Capacitive, Servo (Force Balance), MEMS);

Displacement sensors;
Velocity sensors;
Vibration sensors;
Gyroscopes;
Proximity Sensors;
Electric microphones;
Hydrophones;
Condenser microphones;
Electret condenser microphones;
Dynamic microphones;
Ribbon microphones;
Carbon microphones;
Piezoelectric microphones;
Fiber optic microphones;
Laser microphones;
Liquid microphones; and,
MEMS microphones Optionally, both in-air vibrations or pressure waves and vibrations of components of touch sensitive device 100 can be sensed by vibration sensor system 120 (e.g., one for in-air acoustics, and one for mechanical vibrations, also referred to as structural acoustics). For example the embodiment illustrated in FIG. 2, touch sensitive device 100 has an audio sensor 124 for sensing in-air acoustics and an accelerometer 126 or sensing structural acoustics. Touch sensitive device 100 may use a sensing system 120 having a virtual or wireless connection to a microphone. In this embodiment, vibration sensing system 120 is also shown having an accelerometer 126.

It will be appreciated that many popular touch sensitive devices 100 such as cellular telephones and tablet computers are configured with both an audio sensor 124 and an accelerometer 126 for purposes such as voice communication and motion sensing. Such built in sensors can be utilized without the need for additional sensors, or can work in concert with sensors that are incorporated into touch sensitive device 100 primarily for the purpose of detecting conditions that may provide useful information in the interpretation of user input actions.

Vibration sensor system 120 can also include pressure sensors that can sense an amount of pressure applied by object 118 against touch sensitive surface 112. In some embodiments of this type touch sensitive surface 112 can be of a type that can sense not only which portion of touch sensitive surface 112 has been contacted by object 118 but the amount of pressure applied against touch sensitive surface. Various technologies of this type are known examples of which include, but are not limited to graphics tablets sold under the Wacom brand by Wacom Co., Ltd., Kazo, Saitama, Japan and that are presently capable of sensing 1024 different levels of pressure.

Optionally, vibration sensor system 120 can include one or more sensors that can be incorporated in or on object 118 and that can sense conditions indicative of an amount of force applied between object 118 and touch sensitive surface 112. In such embodiments, vibration sensor system 120 can include a force sensor that can take the form of, for example and without limitation, a piezoelectric sensor, a stress sensor, a strain sensor, a compression sensor, a deflection sensor, or resiliently biased sensing system that can sense force based on an extent of deflection movement of a contact surface against the force of the resilient member and that can generate a signal that is indicative of the amount of force applied by or through an indicator against touch sensitive surface 112.

A vibration sensor system 120 having a sensor in or on object 118 can send signals indicative of an amount of force between object 118 and touch sensitive surface 112 by way of a wired connection or a wireless connection such as by an optional wireless communication module that is capable of communication with communication system 170.

In further embodiments, force sensing can be achieved by providing an object 118 such as a stylus as illustrated in FIG. 1, that may in some embodiments have a rounded flexible tip such as a rubber or metallic mesh tip that are arranged in a resilient manner to flatten when pressed against touch sensitive surface 112 increasing the amount of surface area in contact with touch sensitive surface 112. In such embodiments, the size of the area in contact with touch sensitive surface 112 is an effective proxy for the amount of force applied by a user against touch sensitive surface 112 and in this regard a touch sensitive surface that is capable of sensing area that is in contact with touch sensitive surface 112 can be used for this purpose. Similar results can be achieved, with proper calibration, using a fingertip or other such object 118.

In the embodiment that is shown in FIG. 2, vibration sensor system 120 has a vibration sensor system driver 128 adapted to sample the sensors of vibration sensor system 120 during sensor sample periods and to generate vibration signals 230 that are indicative of conditions at the vibration sensor(s) during the vibration sensor sample periods. Vibration signals 230 can be in analog or digital form and may be processed, amplified, modulated, or otherwise adjusted by vibration sensor system driver 128.

Communication system 170 can take the form of any optical, radio frequency or other circuit or system that can convert data into a form that can be conveyed to an external device by way of an optical signal, radio frequency signal or other form of wired or wireless signal. Communication system 170 may be used for a variety of purposes including but not limited to sending and receiving instruction sets and exchanging data with remote sensors or memory systems.

Sensor hub 200 receives signals from touch sensor system 110 and vibration sensor system 120 makes these signals or data derived from these signals available to other components of touch sensitive device 100. In the embodiment that is illustrated in FIG. 2, sensor hub 200 is arranged to receive signals from touch sensor system 110 and vibration sensor system 120 and has a driver that prepares the signals for transmission through main bus 230 to other components of touch sensitive device 100. In other embodiments, sensor hub 200 can be connected directly to touch sensor system 110 and vibration sensor system 120 and to components of touch sensitive system 110 such as memory system 160, communication system 170 or on optional object classification unit 180.

Sensor hub 200 can optionally process signals received from touch sensor system 110 and vibration sensor system 120. For example and without limitation sensor hub 200 can optionally include analog to digital converters of any known type that can convert analog signals from vibration sensor system 120 into digital signals and may also include amplifiers, filters, including but not limited to noise filters, band pass/band reject filters or couplings, breakers, fusible links or other systems that protect other components of touch sensitive system 100 from potential damage.

Sensor hub 200, according to one embodiment, may perform a function of interfacing with sensing system 108 to sense a sound or vibration generated when object 118 contacts touch sensitive surface 112, or, in other embodiments, other specific parts (i.e., the exterior parts) of touch sensitive device 100.

Output hub 220 is optional and in this embodiment receives signals from processor 150 and optionally other components of touch sensitive system 100 and may use these signals to control operation of display system 130 and audio output system 140 as well as any other output systems that may be incorporated into touch sensitive system. In this regard, output hub 220 may include display drivers, audio output systems including amplifiers and the like.

It will be appreciated that various embodiments of the invention, some or all of the functions ascribed to output hub 220 may be performed by hardware or programs that are integrated in whole or in part in touch sensor system 110 and vibration sensing system 120 including but not limited to touch sensor system driver 116 and vibration sensor system driver 128.

Contact Interpretation

The task of deriving information from contacts between touch sensitive device 100 and an object 118 can be daunting given the challenge of providing a near instantaneous response to such input and the challenge of ensuring that the input is properly understood. In particular it will be understood that not all contacts against a touch sensitive surface 112 are intended as an input. Incidental contacts and other contacts against touch sensitive surface 112 occur frequently and if interpreted in the same manner as intentional contacts these may cause unintended consequences.

Further, input made using touch sensitive surfaces 112 can be complex. For example, such input can take the form of a stroke type input such as signatures, artistic renderings, as well as common file and data manipulations such as cut and paste manipulations. These inputs may range over a wide portion of the input screen and may occur over a relatively extended time period. Depending on the rate at which frame data is obtained, it may be necessary for processor 140 to evaluate many thousands of frames of data to determine stroke data associated with a single stroke and in the case of multi-point touch sensitive systems it may be necessary to track many contact points across these many frames. This makes interpretation of such input a processor intensive task.

Additionally, there is a wealth of additional information that the touch sensitive device can provide to processor 140 that may be highly beneficial to processor 140 in making determinations regarding the intent of the user in bringing an object 118 into contact with touch sensitive surface 112.

For example, a touch sensitive device 100 having a touch sensor system 108 with a vibration sensor system 120 such as the one that is illustrated in FIGS. 1 and 2 may be capable of sensing vibrations carried to vibration sensor system 120 through elements of touch sensitive device 100 or vibrations carried to vibration sensing system 120 by way of a medium surrounding touch sensitive device 100 such as acoustic vibrations carried in air or water. Vibration sensor system 120 has at least one vibration sensor that senses the vibrations and provides a vibration signal that is indicative of the sensed vibrations. Optionally, vibration sensor system 120 may have a vibration sensor system driver 128 that amplifies, powers, filters or otherwise prepares the vibration signal for use by processor 150 or sensor hub 200. In some embodiments vibration sensing system 120 may provide vibration signals in analog form for conversion to digital form by another device such as by way of a sensor hub 200. Vibration sensor system sensor driver 128 may perform other functions as described or claimed herein.

The vibration signal is used by processor 150 determine vibro-acoustic information that can be used during analysis of a touch event. For example, the vibration signal may yield vibro-acoustic information such as the magnitude of the amplitude of the vibrations occurring incident to a contact between an object 118 and touch sensitive surface 112 signal. However, this is not limiting and processor 150 may use any type of statistical, mathematical, or other logical analysis of the vibration signal to determine vibration information that may be useful in operating touch sensitive device 100. The use of the term vibro-acoustic information may encompass any information derivable from vibrations sensed incident to a touch event and may include either or both of information derived from vibrations carried in touch sensitive device 100 to a sensor or vibrations carried to a sensor by way of an intermediate medium such as acoustic vibrations carried in the form of air pressure variations, as well as information sensed in any other manner including but not limited to vibration information sensed by touch sensor system 110 and vibration information sensed by external devices.

Such vibro-acoustic information may be useful to help processor 150 to determine the nature of an object that has made contact with touch sensitive surface 112. One method for doing this is described in commonly assigned and co-pending U.S. patent application Ser. No. 14/612,089, entitled "Method and Apparatus for Classifying Finger Touch Events on a Touch Screen," filed on Feb. 2, 2015, and incorporated by reference herein in its entirety. This application in part describes an apparatus for classifying touch events having a touch sensitive surface configured to generate a touch event when an object or finger touches the touch sensitive surface, wherein the touch event entails a mechanical vibration generated upon contact with the surface, a touch detector configured to detect the onset of a touch and a touch event classifier configured to classify the touch event to identify the object used for the touch event.

Vibro-acoustic information may also be used as described in commonly assigned and co-pending "Capture of Vibro-Acoustic Data used to Determine Touch Types, U.S. patent application Ser. No. 13/958,427 filed on Aug. 2, 2013 and incorporated herein by reference in its entirety. This application describes in part a method for interaction between a user and an electronic device having a touch sensitive surface. In this method a touch event trigger is received that indicates an occurrence of a physical touch event on the touch-sensitive surface. Touch data produced by the touch event is accessed and vibro-acoustic data for a vibro-acoustic signal produced by the physical touch event is accessed for a time window that begins at a time that is prior to receipt of the touch event trigger and a touch type for the touch event is determined based on the touch data and the vibro-acoustic data.

Vibro-acoustic data also may be used as is described in commonly assigned and co-pending U.S. patent application Ser. No. 14/219,919, entitled "Method and Device for Sensing Touch Inputs", filed on Mar. 19, 2014 and incorporated herein by reference in its entirety. This application describes in part, a method for sensing touch inputs to digital equipment in which a sound/vibration signal that is generated by a touch is sensed and the sensed sound/vibration signal is digitally processed. Here the type of touch means as well as a touch intensity is determined based on features derived from time and frequency domain representations of the processed sound/vibration signal.

Additionally, there are vibro-acoustic differences between contact made with a sensing surface when different parts of a input tool contact a touch sensitive surface. These differences are usefully applied in commonly assigned and co-pending U.S. patent application Ser. No. 14/668,870, entitled "Input Tools Having Vibro-Acoustically Distinct Regions and Computing Device For Use With Same," filed on Mar. 25, 2015 and incorporated herein by reference in its entirety. This application describes in part an input tool for interacting with a touch screen, the input tool comprising: a body in the form of a stylus, the body having one or more vibro-acoustically distinct regions, wherein each virbo-acoustically region produces a discrete vibro-acoustic signal when it touches a surface of the touch screen and the virbo-acoustic signal is used to detect what region of the input tool was used. Such vibro-acoustic signals can also be used to discriminate between different types of finger contacts such as contact with the knuckle, fingernail and fingertip as is described in commonly assigned U.S. Pat. No. 9,013,452, entitled "Method and System For Activating Different Interactive Functions Using Different Types of Finger Contact", filed on Mar. 25, 2013 and issued on Apr. 21, 2015 and incorporated by reference in its entirety.

Virbro-acoustic information may also be used to determine which portions of a finger have contacted touch sensitive surface 112 and may for example result in execution of a first action for a first finger touch type and a second action for a second finger touch type. For example, U.S. patent application Ser. No. 13/887,711 entitled "Using Finger Touch Types to Interact with Electronic Devices", filed on May 6, 2013 and incorporated by reference in its entirety describes such an application.

Capacitive data can also provide data that can be useful in analyzing contacts with a touch sensitive surface 112. For example in commonly assigned and co-pending U.S. patent application Ser. No. 14/191,329, entitled "Using Capacitive Images for Touch Type Classification," filed on Feb. 26, 2014, describes in part a method of interaction between a user and an electronic device having a touch sensitive surface. In one aspect of this, a capacitive image is accessed comprising capacitive image data corresponding to capacitances at a plurality of locations on the touch-sensitive surface, the capacitances varying in response to a physical touch on the touch-sensitive surface The capacitive image data is processed and it may be possible to determine a touch type for the physical touch based on the processed capacitive image data. It may also be useful to, where possible to do so, maintain heuristic data regarding such objects.

Touch intensity data can also provide information that can be useful to processor 150 in determining how to react to a touch contact. Such touch intensity data can be determined based upon the touch intensity between object 118 and touch sensitive surface 112 which in turn can be determined for example based upon capacitance, resistance or shear force measurements. Additionally, touch intensity data can be determined based upon sensed variations in an amount of force applied through indicator 130 against touch sensitive surface 112 which can be sensed in the various ways described in greater detail above and in any other know manners for sensing force applied against a surface.

In the embodiment of FIGS. 1 and 2 an object classification unit 180 is provided that can be used to determine object characterization information. Furthermore, object classification unit 180 may transmit contact intensity data characterizing an amount of force applied by or through object 118 during contact. This can be done in one embodiment by providing touch intensity data that corresponds to each element of touch intensity data or by sampling, mathematically processing or otherwise processing force data to characterize the amount of force applied during a frame. Such information can be used by processor 150 in understanding the proper response to contact with an object 118.

It will be understood that operating processor 150 in a manner that continuously monitors frame data from touch sensor system 110 while simultaneously operating processor 150 to monitor and analyze signals from vibration sensor system 120 in real time creates a significant burden on the processor 150 that can make the processor 150 perform functions more slowly and that can reduce the efficiency of processor 150 and, where a portable power supply is used this can have the effect of lowering the run time between charging.

An alternative option of initiating sampling of audio sensor 124 or an accelerometer 126 only after contact is sensed by a touch sensitive surface 112 risks creating conditions where important components of the vibro-acoustic, capacitance and touch intensity patterns are not captured. This limits the usefulness of the information captured after touch is detected.

What is needed therefore is a way to allow touch sensitive device 100 to make vibration data representing conditions that are sensed by vibration sensor system 100 available to processor 150 when needed while enabling processor 150 to operate effectively and efficiently.

Figure 3:
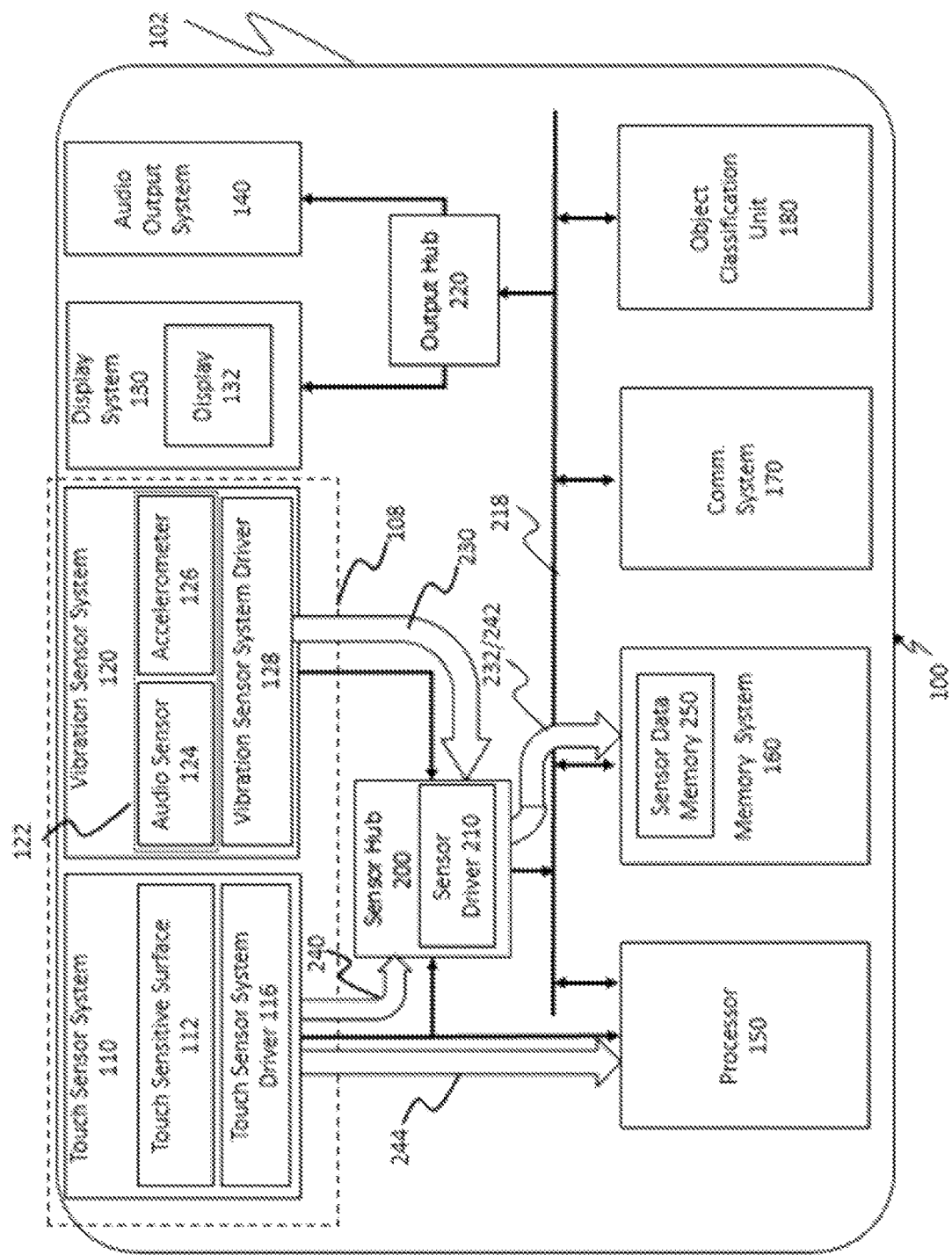
FIG. 3 illustrates an example of the touch sensitive device of FIG. 2 with data flows, in accordance with some embodiments of the invention.

FIG. 3 shows one embodiment of touch sensor system 110 that allows desired information captured by vibration sensor system 120 to be preserved and available while allowing efficient use of processor 150. In the embodiment of FIG. 3, sensor hub 200 receives vibration signals 230 from vibration sensor system 120 that are representative of conditions that are incidental to contact between touch sensor system 100 and object 118. In this embodiment, vibration sensor system 120 has a vibration sensor 122 that includes an audio sensor 124, such as a microphone that senses acoustic signals that are representative of vibrations or pressure changes carried by air or any other medium within which touch sensitive device 110 is operated and an accelerometer 126 that is used to sense vibrational signals carried through touch sensitive device 100. In this embodiment, signals from audio sensor 124 and accelerometer 126 are received by vibration sensor system driver 128 which provides a vibration signal 230 to sensor hub 200 and in this embodiment sensor diver 210. One or both of vibration sensor system driver 128 and a sensor driver 210 shown in this embodiment as being in sensor hub 200 can optionally be used to perform any desired processing or organization of vibration signal 230. Sensor driver 210 causes vibration data 232 to be stored in a sensor data memory 250 which in the embodiment illustrated in FIG. 3 is located in memory system 160. Vibration data 232 may also include any other data or metadata associated with vibration data 232 as well as any other data detected by vibration sensor system 120 or otherwise provided by vibration system driver 128. Vibration data 232 may also include other data determined or derived by sensor driver 210 based upon conditions that are sensed by vibration sensor system 120 or otherwise included in vibration signal 230.

Touch sensor system 110 has a touch sensor system driver 116 that generates touch sensor system signals 240 and frame data 244 based upon conditions sensed at touch sensitive surface 112. Frame data 244 travels to processor 150 for analysis while touch signals 240 are directed to sensor driver 210. Such touch signals 240 include signals that sensor driver 210 can use to determine the presence or absence of any touch against touch sensitive surface 112. Sensor driver 210 performs any desired processing of touch sensor system signals 240 and provides touch data 242 which includes data indicative of touch sensing events including but not limited to times at which contact between touch sensitive surface 112 and an object 118 occurs. In one non-limiting example of this sensor driver 210 provides touch data 242 having indicating whether or not touch sensor signal 240 indicates that there is contact between touch sensitive surface 112 and an object 118. For example, where no contact exists touch data 242 may have a value of 0 and where contact exists the touch data may have a value of 1. Touch data 242 may also include or be based upon frame data 244 and any metadata associated with frame data 244 as well as any other data detected by touch sensor system 110 or otherwise provided by touch sensor system driver 116. Touch data 242 may also include other data determined or derived by sensor driver 210 based upon conditions that are sensed by touch sensor system 110 or otherwise included in touch sensor system signal 240.

In other embodiments, touch sensor system 110 may capable of detecting when an object 118 is within a range of non-touching positions proximate to touch sensitive surface 112 and may include signals indicating the proximate presence of the non-touching object 118. Such a touch sensor system 110 may provide touch sensor system signals 240 including signals from which sensor data driver 210 can determine when an object 118 such as a finger, is hovering within the range of non-contact positions proximate to touch sensitive surface 112 in which object 118 can be detected. In this manner, sensor data driver 210 can provide touch data 242 indicating when object 118 is approaching contact with touch sensitive surface 112, lifts from contact with surface 112 or otherwise changes position within the range of non-touching positions.

In operation, a controller shown here as sensor driver 210 causes touch data 242 to be stored in temporal association with vibration data 232 in a sensor data memory 250. At an initial level, this relieves processor 150 from having to directly process and manage the storage of touch data 242 while preserving such information for use by processor 150 when desired. This may be used, for example, to allow processor 150 to determine whether, for example, data extracted from ongoing analysis of frame data 244 provides sufficient information to make confident decisions about actions that processor 150 is to undertake. Where this data does not provide sufficient information or where processor 150 determines that such information may be otherwise useful, processor 150 can supplement decision making processes by way of analysis of vibration data 232.

Accordingly, it will be understood that having vibration data 232 available to processor 150 is particularly valuable when necessary. However, in the management of a touch sensitive device 100 it is also particularly valuable that relevant portions of vibration data 232 be accessible to processor 150 in a rapid and efficient fashion.

The temporal association between vibration data 230 and touch data 246 with touch events makes it possible for processor 150 to identify and examine relevant portions of sensor system data with the desired rapidity and efficiency. For example, it will be understood that when a signal from audio sensor 124 or accelerometer 126 is useful for classifying the touch type (i.e., touch means), vibration data 232 sampled immediately around and after the touch down event is typically of greatest interest. Accordingly, by maintaining vibration data 232 that is in some type of logical association with touch data 242 that indicates a temporal association between vibration data 232 and touch data 242 data is preserved in a manner that can be quickly accessed by processor 150 and efficiently used to identify one or more segments of vibration data 232 of interest at a particular time. Any stored vibration data 232 that is not temporally stored in association with touch data 242 related to a touch event of interest can be ignored, discarded, overwritten or used for other purposes if appropriate.

Figure 4:
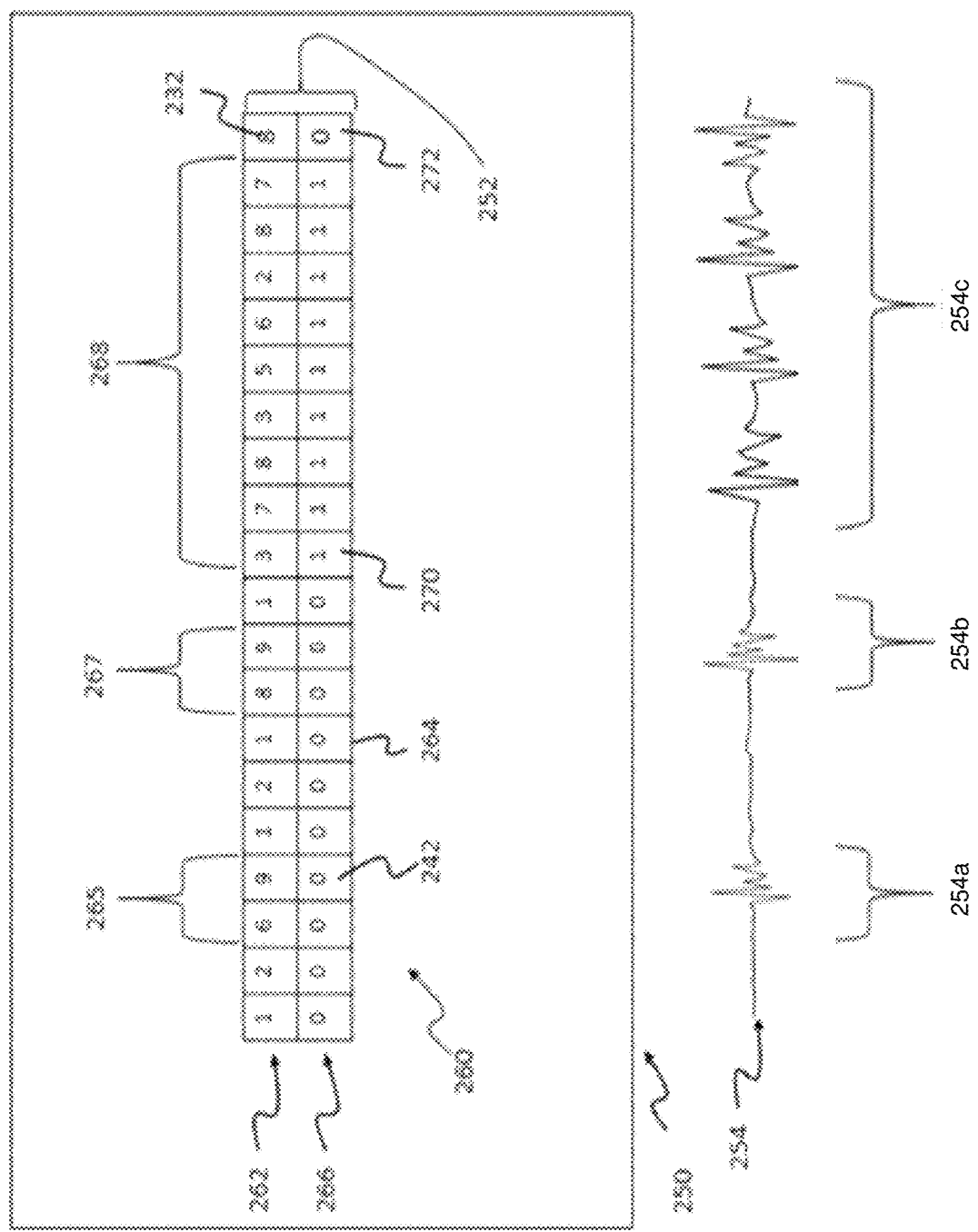
FIG. 4 illustrates an example of a sensor data memory and a vibrational stimulation, in accordance with some embodiments of the invention.

FIG. 4 illustrates a first example of the contents of a sensor data memory 250 in which sensor data 252 including vibration data 232 and touch data 242 is organized into a data structure 260. In this embodiment, sensor data structure 260 stores sensor data 252 in sequential manner using, as illustrated here a series of samples arranged from oldest in time to newest. In this regard sensor data memory 250 can use a First-In-First Out (FIFO) data storage approach or in a First-In-Last-Out (FILO) data storage. Other approaches are possible and these include, but are not limited to, overwriting the oldest sensor data 252 in the sequential data record with the newest sensor data 252 and so that data in the sequential data record is recorded in a circular and continuous fashion. Sequential data structure 260 may also operate as a buffer that simply that stops recording data when out of memory or that erases sensor data 252 at device or session shutdowns or restarts or when modes or application programs are changed. Although data structure 260 is illustrated as a sequential data structure in this embodiment, other known logical data structures may be used so long as a temporal association between vibration data 232 and touch data 242 is maintained.

In this example data structure 260 has a vibration data record 262 with a sequence of numbers representing vibration data 232 sampled during a sequence of sample periods 264 and a touch data record 266 including touch data 242 for each of sample periods 264. In this way, a temporal association is provided between vibration data 232 and touch data 242 within each sample period 264. Other arrangements can be used.

In operation, processor 150 can identify a relevant segment of vibration data record 262 by locating transitions in the state of touch data record 266. For example, in the embodiment illustrated in FIG. 4, processor 150 can determine that segment 268 of vibration data record 262 has data that is of potential interest by locating the transition from a value of 0 (representing for example no object in contact with touch sensitive surface) to 1 (representing for example an indication that an object is in contact with touch sensitive surface) in the touch data record 266 and by initiating analysis of data from vibration data record 262 beginning with data from vibration data record 262 that is associated with or located based upon a detected transition in touch data record 266. This, in turn, allows processor 150 to ignore vibration data 232 in portions of vibration data record 262 that are outside of segment 268.

In the example shown in FIG. 4, a vibrational stimulation 254 of vibration sensor system 120 is illustrated as an analog waveform that is associated in time with vibration data 232 and touch data 242. In FIG. 4, vibration data 232 is representative of vibration sensed by vibration sensor system 120 in response to vibrational stimulation 254. As can be seen in FIG. 4 single channel vibration signal 254 has three portions 254a, 254b and 254c where vibrations are sensed that are above a general baseline and vibration data record 262 has vibration data with three different segments 265, 267, and 268 with data that reflects these conditions. If asked to analyze such vibration data 232, processor 150 would have to perform significant processing to determine which of segments 265, 267 and 268 is a segment of interest in making operating decisions. This is time consuming, processor cycle consuming, power consuming and can lead to errors.

However, as is shown in FIG. 4, in this embodiment touch data 242 occurring during vibrational stimulation 254 is also stored in temporal association vibration data 232. For the purposes of this example, touch data 242 is illustrated as a single channel of data with a 0 being indicative of a time where no contact is sensed between touch sensitive surface 112 and an object 118 and with a 1 representing a time at which contact between touch sensitive surface 112 and an object 118 is sensed.

This arrangement allows processor 150 to examine touch data record 266 to determine which portions of touch data 242 in touch data record 266 are indicative of a touch contact with touch sensitive surface 110. Once that touch data 242 indicative of such touch contact is found, processor 150 can use the temporal association between the determined touch data 242 and vibration data 232 to identify a segment of vibration data record 262 that is of interest.

In the example of FIG. 4, processor 140 can begin analysis of sensor data 252 by analyzing touch data 242 in touch record 266 at a time that is known to be before the time of the touch contact that is being analyzed. In this example, processor 150 can quickly determine that the vibration data 232 in segments 265 and 267 are not related to the touch event of interest in that portions 265 and 267 of vibration data record 262 were obtained at a time that touch sensitive surface 112 was not in contact with object 118 and can perform analysis on segment 268.

In FIG. 4, segment 268 is shown beginning with vibration data 232 that is temporally associated with a transition of touch data 242 from data that indicates no contact between touch sensitive surface 112 and object 118 to a data that indicates that contact between touch sensitive surface 112 and object 118. Here this is illustrated by a transition between touch data having a value of 0 to touch data 232 having a value of 1. Similarly segment 268 ends with vibration data 232 that is temporally associated with a transition of touch data 242 from data that indicates contact between touch sensitive surface 112 and object 118 to a data that indicates that no contact between touch sensitive surface 112 and object 118. Here this is illustrated by a transition between touch data having a value 1 to touch data 232 having a value of 0.

This is not the only approach that can be used for this purpose. In other embodiments, processor 150 may define a segment vibration data 232 for consideration to include, for example and, without limitation, a predetermined extent of vibration data 232 following the occurrence of a transition in the touch data record 264. In other non-limiting alternatives the extent of the vibration data record 262 considered by processor 150 may be variable and may continue until processor 150 has received sufficient information to make particular determinations such as, for example, determinations classifying contacts against touch sensitive surface 112. In such an example, processor 150 can determine to end segment 268 when processor 150 reaches a determination that classifies a contact, a determination that vibration data 232 data does not support a particular classification for the contact or as illustrated here, when an indication of contact with a touch sensitive screen is no longer present. Other criteria can be used for determining the end of a segment of interest 268.

Similarly, it will be appreciated that the start of a segment of interest 268 may begin with vibration data 232 that is associated with sample periods 266 other than an individual one that is associated with a transition in touch data 242 in the touch event data record 266. For example, and without limitation there may be a phase or sampling period difference between vibration data 232 in vibration data record 262 and touch data 242 in touch data record 264. In such cases, or for other reasons, processor 150 therefore may determine the start of a segment 268 of vibration data 232 based upon a detected transition in the touch data record 264 but may include vibration data 232 from sample periods 266 beginning either before or after a change in the touch data 242 in the touch data record 264.

It will be appreciated that vibration data 232 illustrated in vibration data record 262 and touch data 242 illustrated in touch data record 264 in FIG. 4 are for the purpose of illustration and explanation only and are not limiting. For example and without limitation, vibration data record 262 may include any types of data obtainable by sensing system 130, including processed forms of such data, combinations, calculations made using such data and derivatives thereof. Similarly, touch data record 264 may include without limitation touch data 232 that characterizes or that can be used to determine characteristics of any of the following information:

Event type (e.g., hover/proximate finger, no object, touching object, multiple objects)
X/Y coordinates of any fingers on the screen;
orientation of any fingers on the screen;
first and second moments of any touch blobs (fingers) on the screen;
pressure of any fingers on the screen;
raw capacitive image of the touchscreen; and/or
a filtered/processed capacitive image of the touchscreen
and may also include processed forms of such data, combinations, calculations made using such data and derivatives thereof.

Processor 150 can use data stored in sensor data memory 250 to trigger different behaviors in order to better optimize operation of touch sensitive device 100.

The use of the sequential data structure 260 as illustrated is optional and any data configuration or algorithmic or other logical organization allows storage of sensor data 262 which, that includes data characterizing vibrations sensed during a plurality of sequential sample periods along with some form of a logical association between touch data 264 and vibration data 232 such that the touch data can be used to identify a segment of vibration data 232 that may have been sensed at a time of contact between an object 118 and touch sensitive surface 112.

Figure 5:
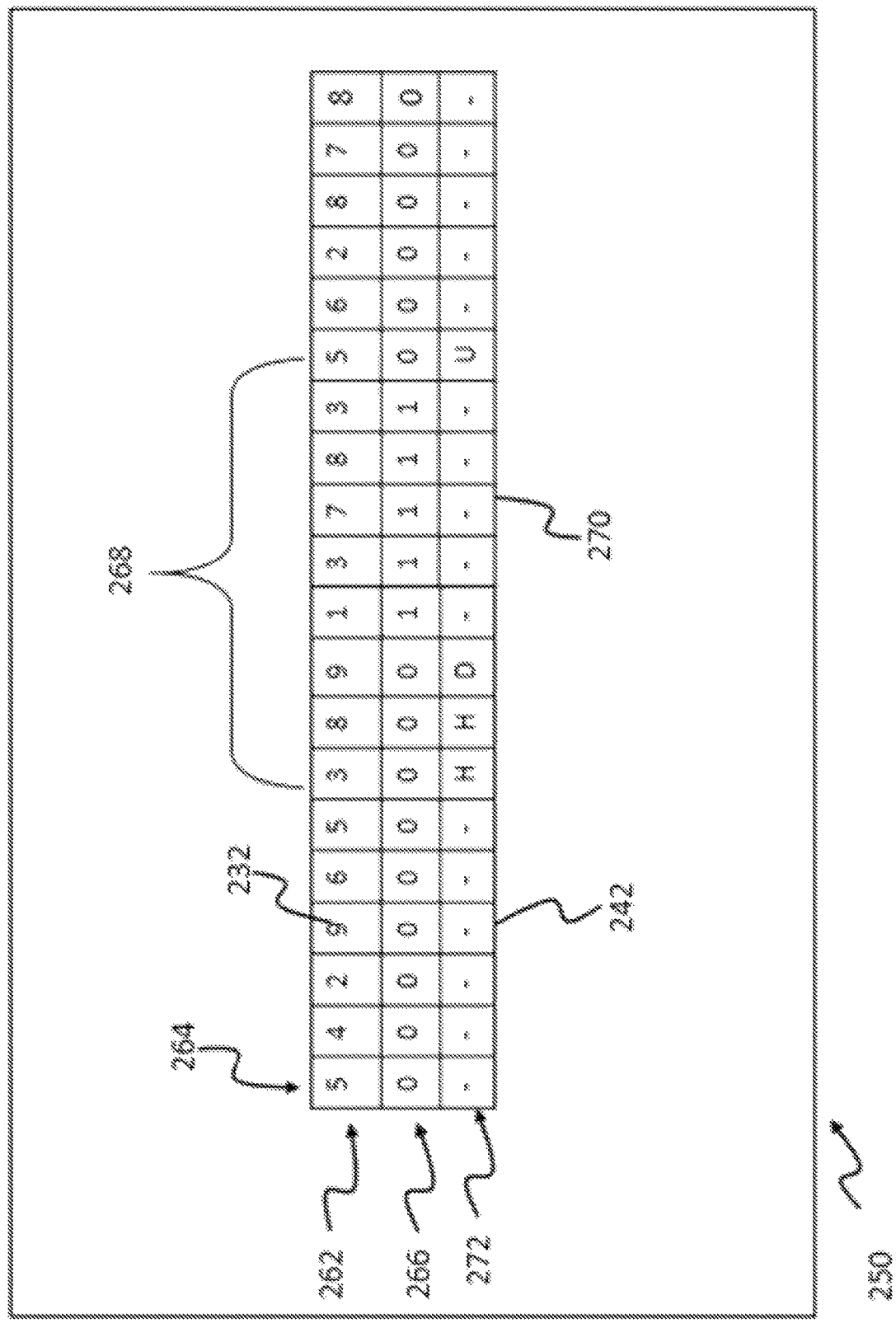
FIG. 5 illustrates another example of a sensor data memory, in accordance with some embodiments of the invention.

FIG. 5 illustrates a sensor data memory 250 having another embodiment of a sensor data record 252 that may be used in conjunction a touch sensitive device such as touch sensitive device 100 of FIGS. 1-3. However, in this embodiment, touch sensitive device 100 is capable of sensing when a finger or other object 118 is positioned within a range of non-contact positions that are proximate to touch sensitive surface 112. In one embodiment, this can be done, for example, using an array of sensing elements 114 that are capable of sensing capacitance changes as a finger or other object is brought closer to touch sensitive surface 112. In other embodiments, other sensors such as infrared or visible light sensors or imagers can be used for this purpose.

Figure 6:
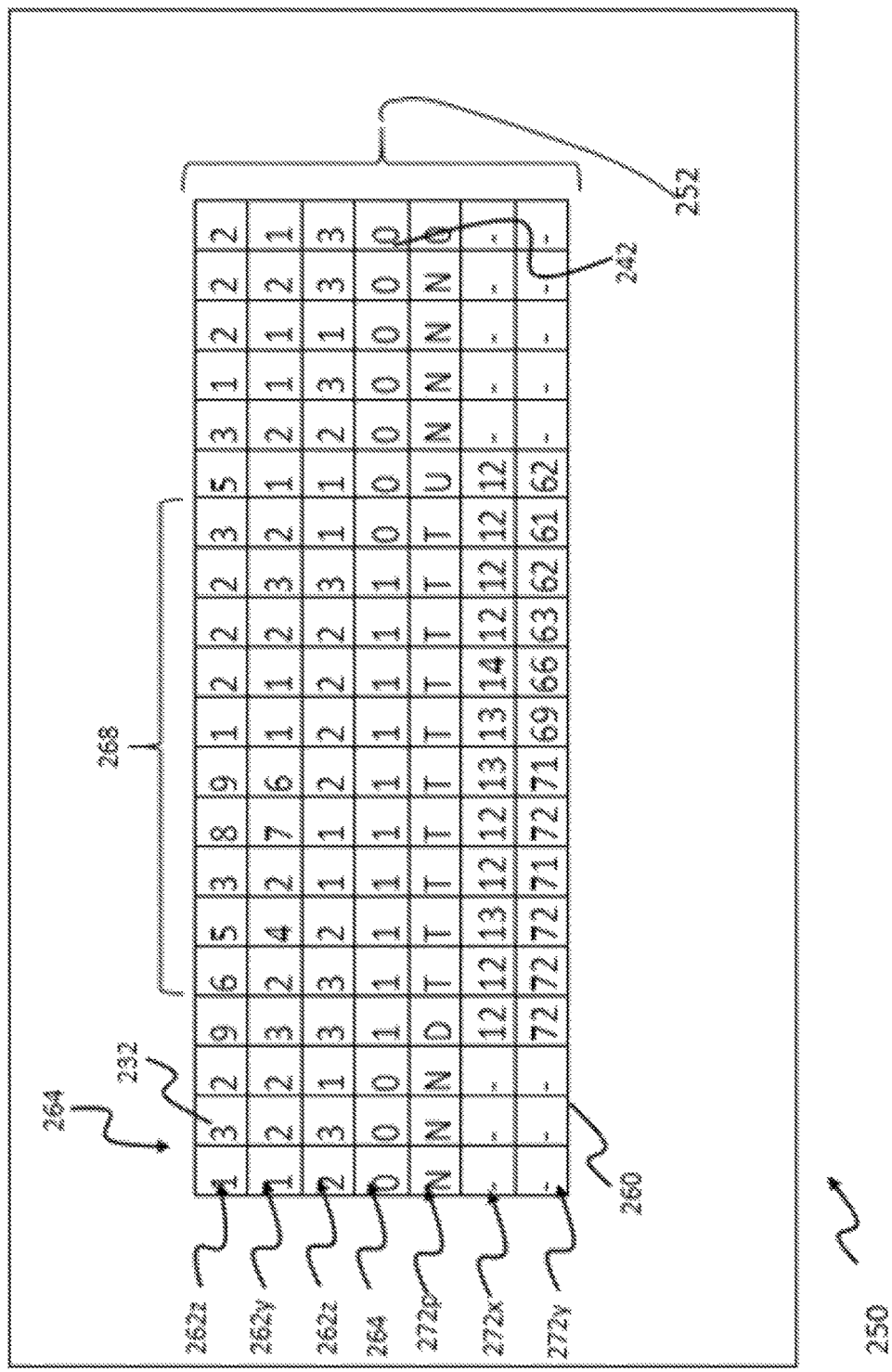
FIG. 6 illustrates another example of a sensor data memory, in accordance with some embodiments of the invention.

In this embodiment, a sequential data structure 260 is used that stores vibration data 232 and touch data 242 that may be generated when touch sensor system 110 shown above is capable of sensing when an object 118 such as a finger is positioned proximate to but not in contact with touch sensitive surface 114. As is illustrated in FIG. 5, in this embodiment, sequential data structure 260 takes the form of a supplemental touch data record 272. Proximity data record 272 includes three different entries, an "H" data point indicating that an object 118 such as a finger is within a range of sensing positions relative to touch sensitive surface 112 and is maintaining a distance from touch sensitive surface 112 but has not contacted touch sensitive surface 112, a "D" data point indicating object 118 is moving toward touch sensitive surface and a "U" data point indicating that object 118 has broken contact with touch sensitive surface 112 and is moving away. Processor 150 can therefore use the "D" data point in this embodiment in identifying when to begin segment 268 or as is shown in FIG. 6, by beginning segment 268 based upon the "H" data point, it becomes possible to define segment 268 to include sensing signal data 232 for sample periods 264 that begin as or just before a vibrational/acoustic signal 252 created by contact between touch sensitive surface 112 and object 118 begins. This can be used to provide one or more of the advantages described above.

Optionally, in such an embodiment, upon detection of a hover/or downward finger event, components of vibration sensor system 120 such as audio sensor 124 and/or accelerometer 126 can be turned on, or put into a high speed/high fidelity mode. Conversely, when an object is lifted from contact with touch sensitive surface or sensed moving away from touch sensitive surface 112 ("touch up event"), audio sensor 124 accelerometer 126 can be turned off, put into a low power mode, put into a low speed/low fidelity mode. This advantageously reduces power consumption and memory requirements.

FIG. 6 shows a sensor data memory 250 having another embodiment of a sequential data structure 260. In this embodiment both touch data record 242 having touch data 232 stored therein and a supplemental touch data record 272 is used to record any other information obtained by sensor system 108 regarding the proximity of an object 118 to touch sensitive surface 112 or contact between object 118 and touch sensitive surface 112. Without limitation supplemental touch data record 272 can include as illustrated, separate records with touch data 232 in a touch data record 264, a proximity data record 2'72p, an x-axis data record having data indicating an x-axis position of the detected contact 272x, and a y-axis data record having data indicating a y-axis position of the detected contact 272y. The x-axis data 272x and y-axis data 272y indicate a coordinate of contact between object 118 and a touch sensitive surface 114 and, optionally, can be used to indicate a coordinate of any sensed proximity.

As is also shown in FIG. 6, vibration data 262 may include data that is in one or more axis such as where audio sensors are made directional or where three axis sensors are used to sense vibration. In the example shown in FIG. 6, data from a three axis sensor is organized into an x-axis vibration data record 262x, a y-axis vibration data record 262y, and a z-axis vibration data record 262z. Here all are shown in temporal association with touch data in touch records 272t, 272p, 272x, and 272y. However, in other embodiments a temporal association may be necessarily maintained between two of these data records with other portions of such records used for other purposes by processor 150.

It will be appreciated from FIG. 6, that other types and kinds of data and metadata and data derived from either of vibration signals 230 and touch signals 240 and from other sources can be stored in memory 150 optionally in temporal association and that the records illustrated in FIG. 6 are exemplary and not limiting.

Figure 7:
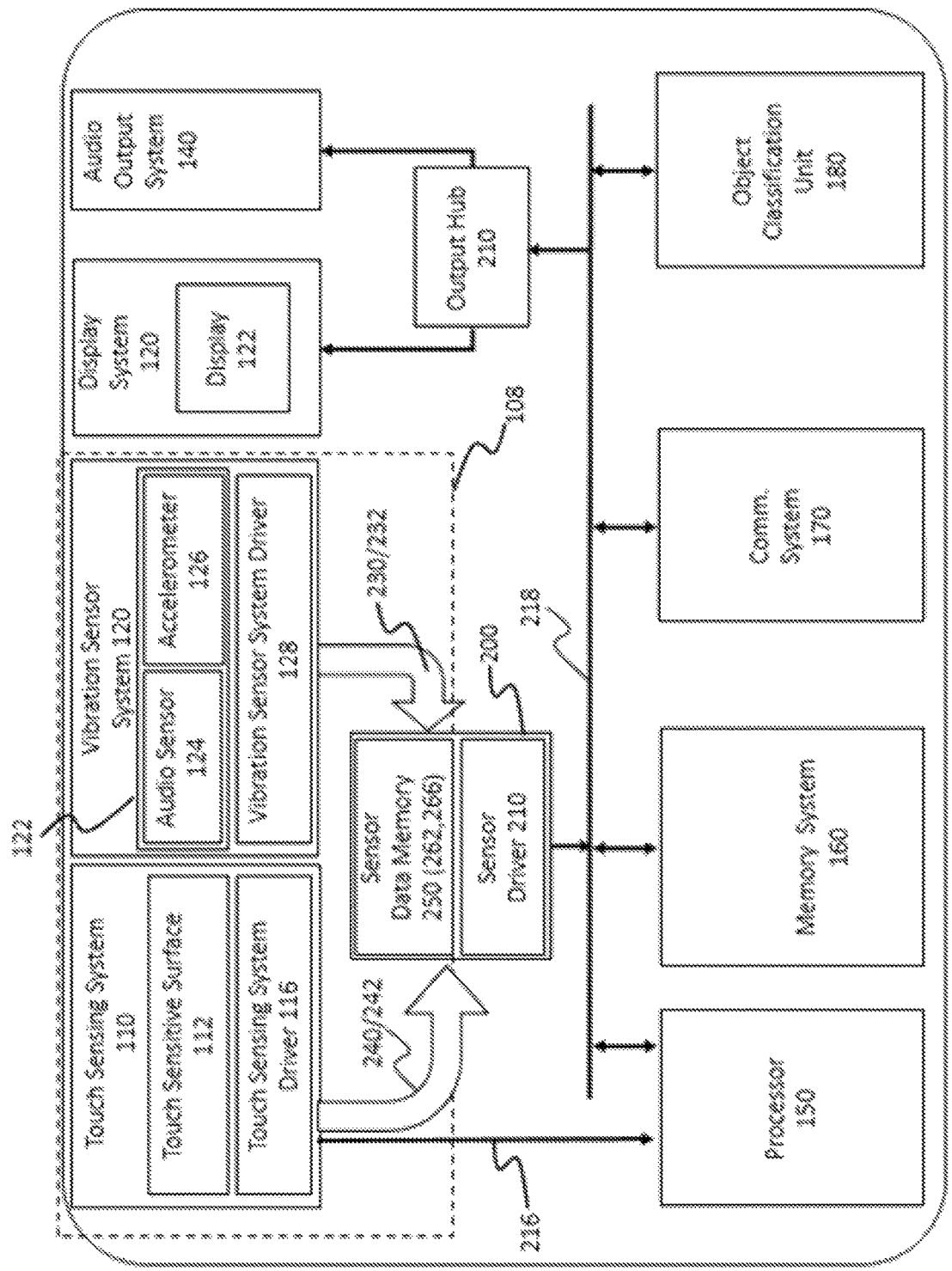
FIG. 7 illustrates another example of a touch sensitive device, in accordance with some embodiments of the invention.

In the embodiment of FIGS. 1-3, sensor data memory 250 is illustrated being located in memory system 160. However, in other embodiments, sensor data memory 250 can be located in other portions of a touch sensitive device 100. For example, in the embodiment illustrated in FIG. 7, sensor data memory 250 is illustrated as being located in sensor hub 200. This advantageously allows vibration signals 230 as well as touch sensor system signals 240 to pass to sensor hub 200 where sensor driver 210 can convert these as necessary into vibration data 232 and touch data 242 for storage as vibration data record 262 and touch data record 266 in sensor data memory 250 without burdening main bus 218 with high speed data flows.

Figure 8:
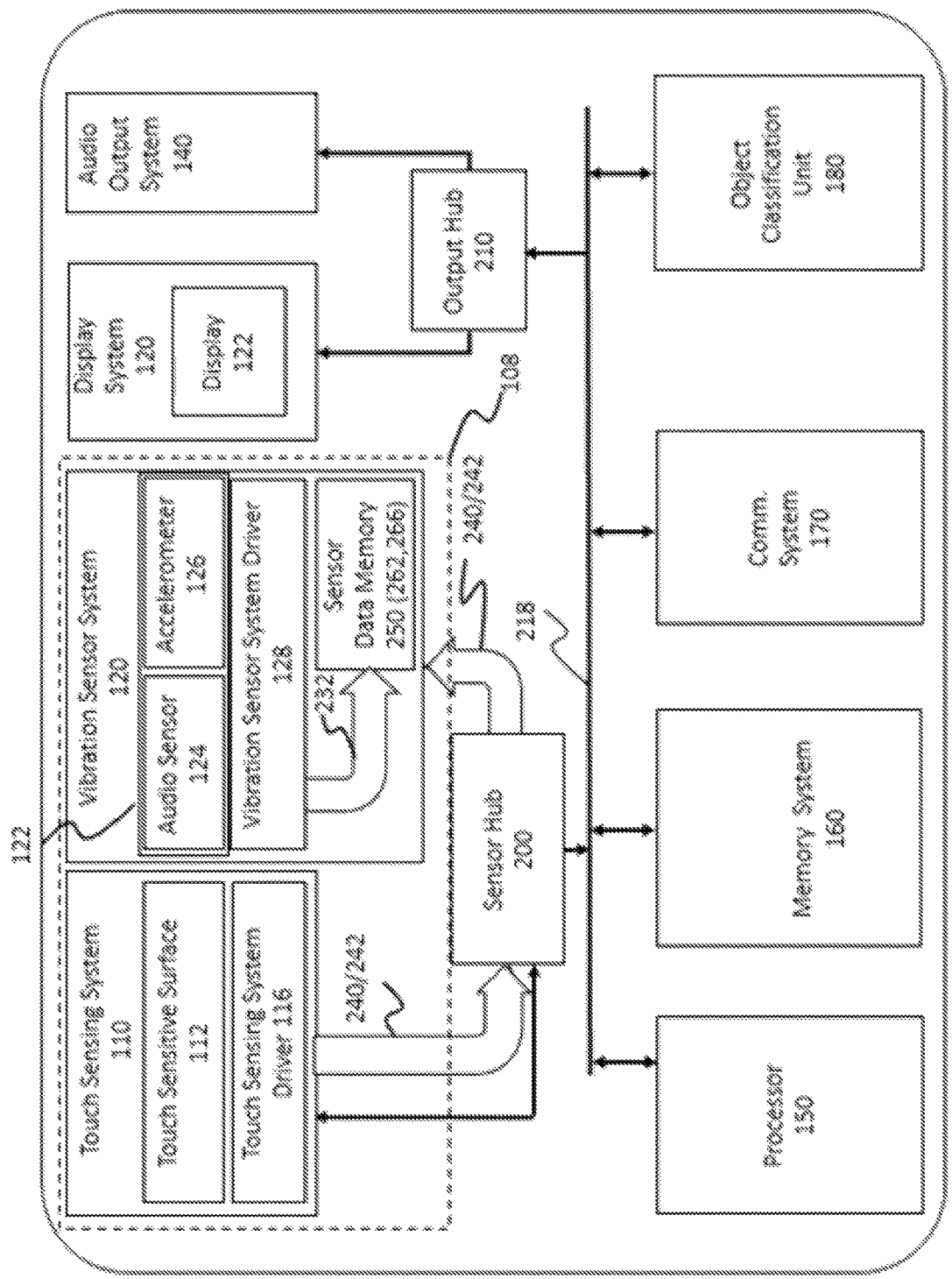
FIG. 8 illustrates another example of a touch sensitive device, in accordance with some embodiments of the invention.

In still another embodiment illustrated in FIG. 8, sensor data memory 250 is located in vibration sensor system 120 with touch sensor system signals 240 or touch sensor signal data 242 passing to sensor hub 200 and with touch sensor system signals 240 or touch data 242 then being passed along to vibration sensor system 120 for storage in sensor data memory 250 in temporal association with vibration data 232. Touch sensor system signals 240 or touch sensor signal data 242 can be further processed by vibration sensor system driver 128 or sensor hub 200 before storage in sensor data memory 250. Such processing can include for example and without limitation converting touch sensor system signals 240 into touch sensor signal data 242, using touch sensor signal data 242 to create a touch data record, or creating a temporal association between vibration data record 262 and touch data record 266. This embodiment allows the use of memory circuits (not shown) that may be available in vibration sensor system 120 and optionally can also leverage other capabilities of components of vibration sensor system 120. Similarly, in this embodiment touch sensor driver 116 can be used to process touch data 242 to from touch data record 266. In some embodiments of this type, vibration sensor system driver 128 can also be used to provide instructions or synchronization signals to touch sensor system 110. Here too, this approach allows a sensor data memory 250 to be created without necessarily burdening main bus 220.

Figure 9:
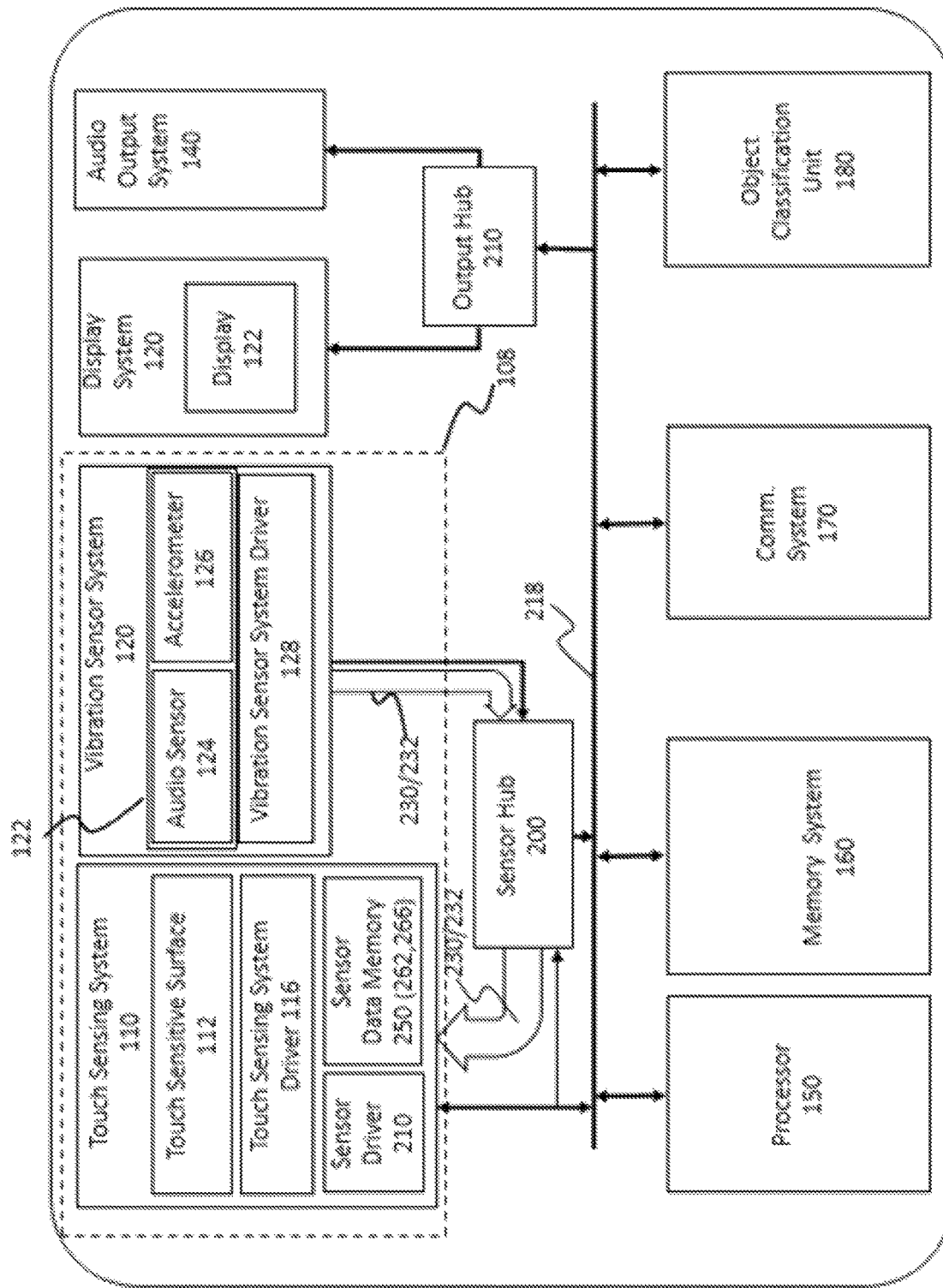
FIG. 9 illustrates another example of a touch sensitive device, in accordance with some embodiments of the invention.

In a further embodiment illustrated in FIG. 9, sensor data memory 250 is located in touch sensor system 110 with vibration signals 230 or vibration data 232 passing to sensor hub 200 and with vibration signals 230 or vibration data 232 then being passed along to touch sensor system 110 for storage in sensor data memory 250 in temporal association with touch sensor signal data 232. Vibration signals 230 or vibration data 232 can be further processed by touch sensor system driver 116 or sensor hub 200 before storage in sensor data memory 250. Such processing can include for example and without limitation converting vibration signals 230 into vibration data 232, using vibration data 232 to create a vibration data record 262, or creating a temporal association between vibration data record 262 and touch data record 266. Such an approach allows the use of memory circuits (not shown) that may be available in touch sensor system 110 and optionally can also leverage other capabilities of components of touch sensor system 110. In some embodiments of this type, touch sensor system driver 116 can also be used to provide instructions or synchronization signals to vibration sensor system 120. Here too, this approach allows sensor data memory 250 to be created without necessarily burdening main bus 218 which in this embodiment can be useful as in this embodiment main bus 218 is optionally used to carry all data from touch sensor 110 to processor 150.

Figure 10:
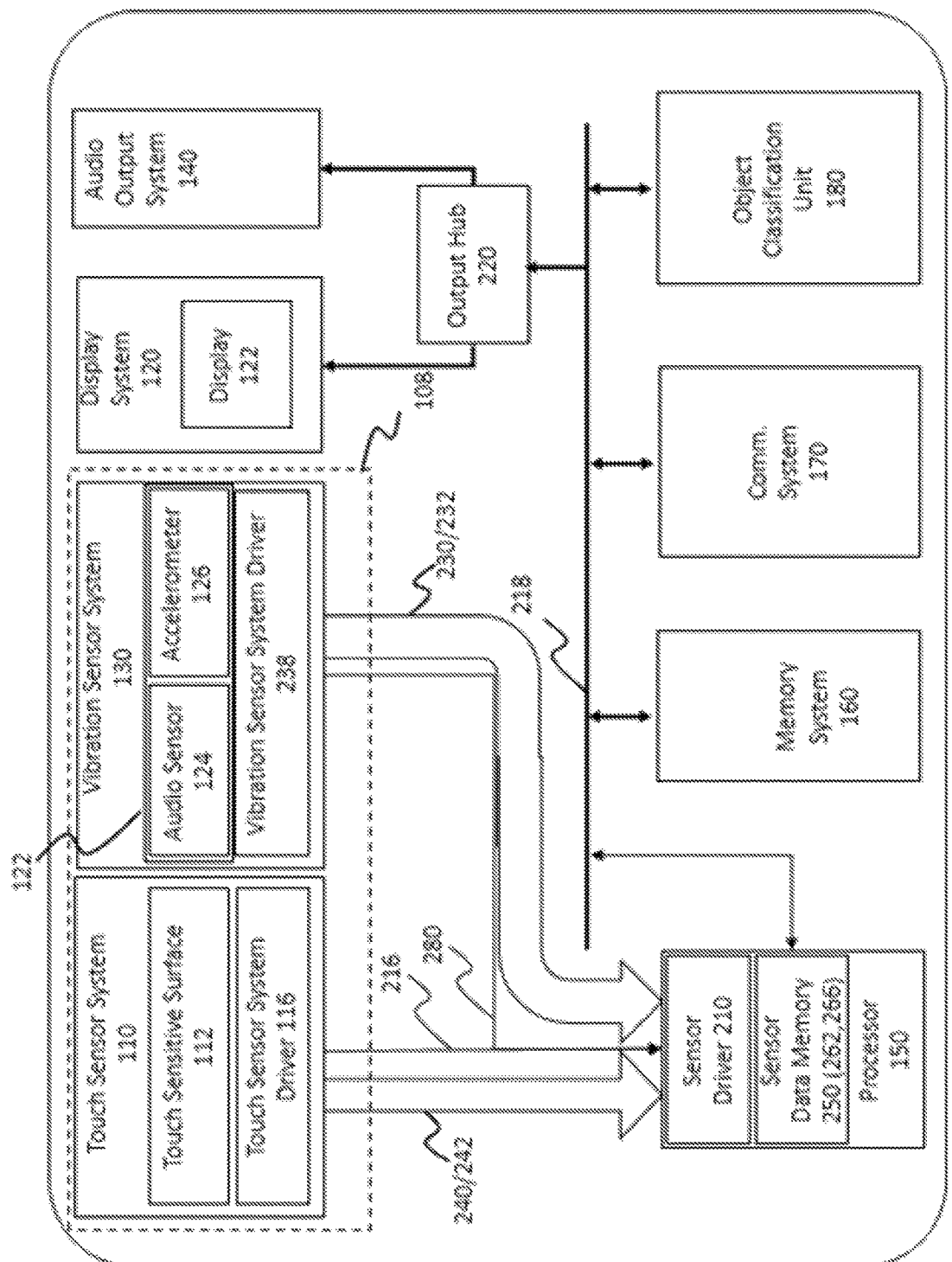
FIG. 10 illustrates another example of a touch sensitive device, in accordance with some embodiments of the invention.

FIG. 10 illustrates yet another embodiment of the invention. As is shown in FIG. 10, in this embodiment, sensor data memory 250 is located in processor 130 with touch sensor system 110 providing touch sensor signal data 240 or touch sensor signal data 242 to sensor hub 200 and with vibration sensor system 120 providing vibration signals 230 or vibration data 230 to a sensor driver 210 in processor 140 and with sensor driver 210 using vibration data 230 and touch sensor signal data 242 to create vibration data record 262 and touch data record 266 and to establish a temporal association between vibration data record 262 and touch data record 266 in a portion of processor 150 such as a cache memory or other memory of processor 150. This allows a portion of processor 150 such as one core of a multi-core processor or an integrated I/O module to create as sequential data a structure 260 within sensor memory 250 having vibration data and touch data stored in temporal association without interfering or substantially interfering with the operations of processor 150. In one embodiment of this type, sensor memory 250 is located in a cache memory of processor 150 and in this way allows very high speed access to the data stored in sequential data structure 260.

As is also shown in this embodiment, vibration signal 230, vibration data 232, touch signal 240 and touch data 242 optionally can be provided to sensor data memory 250 through a direct data connection 280 so that main bus 218 is not burdened by such data flows, however other arrangements are possible in other embodiment. Additionally, as is shown in this embodiment, a separate sensor hub 210 is not required. It will be appreciated that in other embodiments, sensor data memory 250 can be stored in other components of touch sensitive device 100 such as for example and without limitation object classification unit 180.

It will be appreciated that in other embodiments the functions ascribed to sensor driver 210 may be performed by more than one component such as by combined action of components such as touch sensor system driver 116, vibration sensor system driver 120, sensor hub 200, processor 150 and memory 160. In that sense sensor driver 210 may be located in part or in whole in any of these components.

Touch sensitive device 100 can take forms other than those described herein including but not limited to any type of digital equipment having a touch sensor system 110 and a processor 130 such as a micro-processor, micro-controller, or any other type of programmable control device, or a preprogrammed or dedicated processing or control system. Examples of such touch sensitive devices 100 include but are not limited to desktop computers, notebook computers, workstations, PDAs, web pads, and mobile phones (other than smartphones). Similarly, touch sensitive device 100 can take other forms such as the forms of standalone touch pads and track pads as well as systems that incorporate touch sensitive surfaces and 102 such as touch pads, graphics tablets and track pads. In this regard, it will be appreciated that while the components of touch sensitive device 100 are illustrated as being within a single housing 102, this is optional, and these components may be located in separately housed components of touch sensitive device 100. however, can take the form of a cellular telephone, personal computer, a display table, a personal digital assistant, a television or a touch sensitive graphic tablet typically has a touch sensitive surface 112 that is capable of sensing when an object has been brought into contact with touch sensitive surface 112.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as optical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described above in connection with specific limitations such as detailed components as well as limited embodiments and drawings, these are merely provided to aid general understanding of the invention. The present invention is not limited to the above embodiments, and those skilled in the art will appreciate that various changes and modifications are possible from the above description. Therefore, the spirit of the present invention shall not be limited to the embodiments described above, and the entire scope of the appended claims and their equivalents will fall within the scope and spirit of the invention.

What is claimed is:

1. A touch sensitive device, comprising:
 a touch sensor system having a touch sensitive surface that senses contact made by an object to or proximate to the touch sensitive surface and that generates touch signals indicative of the contact sensed by the touch sensor system;
 a vibration sensor system that senses vibrations that occur when the contact is made by the object to the touch sensitive surface and that senses vibrations that are not associated with the contact and that generates vibration signals indicative of the vibrations sensed by the vibration sensor system;
 a sensor data memory; and
 at least one controller adapted to receive the vibration signals and to cause vibration data indicative of particular vibrations sensed during each of a plurality of sample periods to be stored in a vibration data in the sensor data memory, wherein the controller is further adapted to receive the touch signals and to cause touch data to be stored in the sensor data memory in temporal association with the vibration data record, wherein the at least one controller provides a first portion of the vibration record data that is in temporal association with the touch data for the contact to a processor, and wherein the at least one controller does not provide a second portion of the vibration data that is not in temporal association with the touch data for the contact to the processor so that the second portion of the vibration data corresponds to vibrations that are not associated with the contact.

2. The touch sensitive device of claim 1, wherein the vibration sensor senses at least one of vibrations of the touch sensitive device, vibrations of a medium proximate to the touch sensitive device and acoustic vibrations.

3. The touch sensitive device of claim 1, wherein the vibration sensor comprises a touch sensor that senses conditions indicative of the touch.

4. The touch sensitive device of claim 1, wherein the touch data is stored in a touch data record, and wherein the touch data indicates whether there is contact between the object and the touch sensitive surface during a sample period.

5. The touch sensitive device of claim 4, wherein a duration of the sample periods is changed in response to a touch signal indicating the proximate presence of an object.

6. The touch sensitive device of claim 5, wherein a sensor hub is joined to a main bus such that the sensor system data and touch data are provided to the sensor hub without passing through the main bus.

7. The touch sensitive device of claim 1, wherein the touch sensor system is adapted to sense when the object is in a position that is proximate to but not in contact with the touch sensitive surface and generates a touch signal from which the controller further stores data in the touch data indicating the proximate presence of the object that is not in contact with the touch sensitive surface.

8. The touch sensitive device of claim 1, wherein the temporal association comprises providing a data structure having vibration data representing sensed vibrations during a plurality of sequential sample periods having a logical association with touch data representing sensed contact with the touch sensitive surface during each of the plurality of sequential sample periods such that the touch data can be used to identify a segment of the vibration data that may have been sensed at a time of contact between an object and the touch sensitive surface.

9. The touch sensitive device of claim 1, wherein the temporal association comprises providing a sequential data structure having vibration data representing sensed vibrations during a plurality of sequential or substantially sequential periods arranged in association with touch data associated with the sequential data structure such that the touch data can be used to identify a segment of the vibration data that may have been sensed at a time of contact between an object and the touch sensitive surface.

10. The touch sensitive device of claim 1, wherein the sensor data memory is located in a sensor hub that is linked to the touch sensor system and the vibration sensor system.

11. The touch sensitive device of claim 1, wherein the at least one controller comprises a touch sensor system driver and wherein the sensor data memory is positioned in the touch sensor system.

12. The touch sensitive device of claim 1, wherein the at least one controller comprises a vibration sensor system driver and wherein the sensor data memory is positioned in the touch sensor system.

13. The touch sensitive device of claim 1, further comprising sensor hub and wherein the at least one controller comprises a driver in the sensor hub and wherein the sensor data memory is positioned in the sensor hub.

14. The touch sensitive device of claim 1, wherein the sensor data memory is at the processor and wherein the at least one controller is at least one of a touch sensor system driver, a sensor system driver and a driver in a sensor hub.

15. The touch sensitive device of claim 1, further comprising object classification unit that analyzes a segment of the vibration data and the touch data to classify an object contacting the touch sensitive surface.

16. The sensitive device of claim 1 wherein the vibration is an acoustic vibration.

17. A sensor system for use in a touch sensitive device, comprising:

a first sensor adapted to sense a first physical condition experienced at the touch sensitive device and to generate a first sensor signal, the first physical condition associated with when a contact is made by an object proximate to or in direct contact with the touch sensitive surface and that generates the first sensor signal; and a sensor driver adapted to receive the first sensor signal and store first sensor data in a sensor data memory representing conditions, including the first physical condition, sensed during each of a sequence of sample periods and further adapted to receive a vibration signal indicative of a plurality of conditions, including the first physical condition and a second physical condition experienced at the touch sensitive device, and to store second sensor data for the vibration signal in the sensor data memory in temporal association with the first sensor data, wherein the second physical condition is independent of the first physical condition;

wherein the sensor driver is adapted to provide a first portion of the first sensor data and the second sensor data that are temporally associated together in association with the first physical condition to a processor, and wherein the sensor driver is adapted to not provide a second portion of the first sensor data and the second sensor data that are temporally associated together in association with the second physical condition to a processor.

18. The sensor system of claim 17, further comprising a second sensor adapted to sense the first and second physical condition experienced at the touch sensitive device and to generate the second sensor signal.

19. The sensor system of claim 17, wherein sensor data memory is located in one of the first sensor, the second sensor, a sensor hub and the processor.

* * * * *